United States Patent [19]
Crosbie et al.

[11] Patent Number: 5,353,242
[45] Date of Patent: Oct. 4, 1994

[54] MOTION BASE CONTROL PROCESS AND OPERATOR PERCEPTUAL SIMULATOR

[75] Inventors: Richard J. Crosbie, Langhorne; Joseph Colombo, Newtown; W. Graham Tasman, Philadelphia, all of Pa.

[73] Assignee: Veda Incorporated, Warminster, Pa.

[21] Appl. No.: 709,058

[22] Filed: Jun. 3, 1991

Related U.S. Application Data

[63] Continuation-in-part of Ser. No. 291,290, Dec. 28, 1988, Pat. No. 5,021,982.

[51] Int. Cl.$^5$ ............................................. G09B 9/08
[52] U.S. Cl. .................................. 364/578; 434/55; 434/59
[58] Field of Search .................... 364/578; 434/30, 35, 434/37, 45, 46, 51, 55, 59

[56] References Cited

U.S. PATENT DOCUMENTS

| | | | |
|---|---|---|---|
| 2,687,580 | 8/1954 | Dehmel | 434/55 |
| 4,207,688 | 6/1980 | Derderian et al. | 34/43 |
| 4,236,325 | 12/1980 | Hall et al. | 434/45 |
| 4,244,120 | 1/1981 | Harris | 434/59 |
| 4,280,285 | 7/1981 | Haas | 434/58 |
| 4,710,128 | 12/1987 | Waschsmuth et al. | 434/46 |
| 4,710,129 | 12/1987 | Newman et al. | 434/55 |
| 4,751,662 | 6/1988 | Crosbie | 364/578 |
| 5,021,982 | 6/1991 | Crosbie et al. | 364/578 |

OTHER PUBLICATIONS

Crosbie, R. J., "Application of Experimentally Derived Pilot Perceptual Angular Response Transfer Fucntions," AIAA Flight Simulators Technologies Conference and Technical Display, Jun. 13–15, 1983, Niagra Falls, N.Y.

Crosbie, R. J. and Kiefer, D. A., "Controlling the Human Centrifuge as a Force and Motion Platform for the Dynamic Flight Simulator," AIAA Flight Technologies Conference, Jul. 22–24, 1985, St. Louis, Missouri.

Crosbie, R. J., "Explicit Expressions for the Angular Accelerations and Linear Accelerations Developed at a Point Off Center in a Gondola Mounted with a Three Gimbal System on the End of a Moving Centrifuge Arm," NADC-MA-6034, Oct. 17, 1960.

"Dynamic Flight Simulator Centrifuge Configuration Alternatives for Enhanced Fighter Maneuverability Operations," Veda Report No. 34753-87U/P3511-002. Delivered to the Naval Air Devcelopment Center, Warminster, Pennsylvania, on Dec. 28, 1987.

"Final Technical report Study/Services Contract Centrifuge Control System Analysis," Veda Report No. 34753-87U/P3512-004. Delivered to the Naval Air Development Center, Warminster, Pennsylvania, on Apr. 30, 1988.

"Centrifuge Control Algorithm Enhancement Analysis: Low-G Provision," Veda Report No. 33514-88U/P35-11-002. Delivered to the Naval Air Development Center, Warminster, Pennsylvania, on May 12, 1988.

Primary Examiner—Thomas G. Black
Assistant Examiner—Collin W. Park
Attorney, Agent, or Firm—Finnegan, Henderson, Farabow, Garrett & Dunner

[57] ABSTRACT

A process for controlling a gimballed motion base system substantially duplicating operator perceptions in a simulated vehicle. Such vehicles may include but not be limited to, aircraft, automobiles, boats, roller coasters, bob sleds, and futuristic space vehicles. The process includes: a subprocess accounting for an effect of yaw on a motion base arm, a full-G bias function and a limited-G bias function, a low-G bias function, improved computation of pitch and roll gimbal commands to negate artifacts, a negative-G process, allowing various yaw gimbal positions, allowing various cockpit orientations, and a yaw gimbal control process.

A perceptual model based on empirically observed human response data predicts perceived pitch, roll, and yaw, and accounts for the fact that a Gy component of linear acceleration affects both roll and yaw perception.

15 Claims, 18 Drawing Sheets

MOTION BASE CONTROL PROCESS AND OPERATOR PERCEPTUAL SIMULATOR

BACKGROUND OF THE INVENTION

The present application is a continuation in part of U.S. application Ser. No. 291,290, which filed Dec. 28, 1988, is now U.S. Pat. No. 5,021,982 on Jun. 4, 1991, and is herein incorporated by reference.

The present invention relates to a gimballed motion base system used for simulating the force and motion environment associated with various types of moving vehicles and more particularly to a control system for a motion base system for enhancing realism for an occupant with regard to his perception and response to the linear and angular motions generated by the motion base system.

A. Visual, Physiological, and Proprioceptive Perceptions in a Human Pilot

A ground-based motion base system provides a safe and convenient aeronautical research facility for test and evaluation of new concepts and crew station design, cockpit displays and controls, restraint systems, aerodynamic configurations, and handling qualities. Moreover, such a system provides training in pilot procedures in the acceleration, or G-environment, in which they are designed to be used. The invention is also useful in the development of air frames, and crew protective mechanisms and techniques.

Furthermore, the invention can be used to simulate a wide variety of vehicles, such as automobiles, boats, roller coasters, bobsleds, and futuristic space vehicles.

Throughout this document, the terms "roll axis", "pitch axis" and "yaw axis" of a vehicle are used. A "roll axis" is taken to mean the horizontal axis running between the nose and tail of the vehicle in the direction of primary linear acceleration, as shown in FIG. 16(a). The "pitch axis" of an vehicle, for example, is taken to mean the horizontal axis bisecting the plane through both wings, as shown in FIG. 16(b). The "yaw axis" is taken to mean the vertical axis running through the intersection of the pitch and roll axes, as shown in FIG. 16(c).

U.S. Pat. No. 4,751,662 to Richard J. Crosbie (hereinafter referred to as the '662 patent) which is herein incorporated by reference, discloses a motion base control system. FIG. 1 is a figure from the '662 patent showing a closed-loop human sensing system for an aircraft pilot controlling an aircraft 10 in flight through manually operated controls 11. In addition to feedback through the feel of the control stick and foot pedals, the pilot senses the angular motion and linear force stimuli through his visual, proprioceptive, and physiological receptors.

The visual receptors sense the angular motion, including position, rate, and acceleration of the aircraft, as seen by the pilot through the aircraft canopy and the instrument displays within the cockpit. The physiological receptors sense the linear acceleration forces imparted to various parts of the pilot's body. The proprioceptive receptors sense the angular motion of the pilot as perceived through his tactile/kinesthetic and vestibular receptors. Angular motion stimulation for these proprioceptive receptors can be separated into two components: angular acceleration and rotating linear acceleration vectors. Thus, the visual receptors receive their stimuli from the angular motions of the aircraft, the physiological receptors from the linear forces of the aircraft, and the proprioceptors from both the angular motion and linear acceleration vectors. Measurements made of human perceptual responses to separate and combined oscillatory stimuli of angular acceleration and rotating linear acceleration vectors about the roll and pitch axes reveal that, when the mean phase angle shifts of the perceived responses for each component stimulus are taken into account, the perceived response to the combined stimuli can be predicted from the scaled sum of the responses.

FIGS. 2(a), 2(b), and 2(c) illustrate the three different ways the angular acceleration and rotating linear acceleration vectors combine to create the pilot's perception of angular rotation $\phi_a$ about the aircraft roll axis. In pure vector rotation $\phi_{va}$, (FIG. 2(a)) where the pilot is stationary while a total G vector rotates, the vestibular otolith organs in the inner ear of the pilot along with tactile/kinesthetic receptors of a pilot, are stimulated by the rotating vector G. In pure angular rotation $\phi_{aa}$, (FIG. 2(b)), where the vector and pilot both rotate through the same angle, the vestibular semicircular canals are stimulated by the angular accelerations. In combined angular and vector rotations $\phi_{va}+\phi_{aa}$ (FIG. 2(c)), where the vector G is stationary while the pilot rotates, the otolith and semicircular canals are both stimulated, together with the tactile/kinesthetic receptors. Consequently, by controlling the roll and pitch gimbal drive signals of a motion base system to create rotating linear acceleration vectors in a timely fashion with respect to pure angular rotations, more accurate angular perceptions on the part of the pilot can be achieved.

B. Hardware for a Motion Base System

FIG. 3 shows a two-gimbal system similar to the system controlled by the apparatus of the '662 patent. An aircraft cockpit (not shown) is mounted at the end of an arm 12 of radius r, e.g., 50 feet, rotating at an angular velocity $\omega_c$. The gimbal system includes an outer A gimbal 13 rotating through an angle $\phi_c$ about a horizontal axis perpendicular to arm 12, and an inner B gimbal 14, rotating through an angle $\theta_c$ about an axis in the plane of outer A gimbal 13 and perpendicular to its axis. The A and B gimbals are controlled by motors (not shown).

The angles $\phi_c$ and $\theta_c$, along with the angular velocity $\omega_c$ of the arm 12 constitute three independent, controllable functions used in controlling the motion base system, and manifest the orthogonal components $G_{rc}$, $G_{tc}$, and $G_{vc}$ for radial, tangential, and vertical accelerations, respectively. They are related to the transverse, lateral, and longitudinal acceleration components $G_{xc}$, $G_{yc}$, and $G_{zc}$, and the roll, pitch, and yaw angular velocities $p_c$, $q_c$, and $r_c$ experienced by motion base pilots through the following equations:

$$G_{xc} = G_{tc}\cos\theta_c - G_{rc}\sin\phi_c\sin\theta_c + G_{vc}\cos\phi_c\sin\theta_c. \quad 1.$$

$$G_{yc} = G_{rc}\cos\phi_c + G_{vc}\sin\phi_c. \quad 2.$$

$$G_{zc} = -G_{tc}\sin\theta_c - G_{rc}\sin\phi_c\cos\theta_c + G_{vc}\cos\phi_c\cos\theta_c. \quad 3.$$

$$p_c = \dot{\phi}_c\cos\theta_c + \omega_c\cos\phi_c\sin\theta_c. \quad 4.$$

$$q_c = \dot{\theta}_c - \omega_c\sin\phi_c. \quad 5.$$

$$r_c = -\dot{\phi}_c\sin\theta_c + \omega_c\cos\phi_c\cos\theta_c. \quad 6.$$

FIG. 4 shows a three gimbal system similar to those used in previous motion base systems. In FIG. 4, an aircraft cockpit (not shown) is fixedly mounted in an innermost gimbal of a three gimbal system at the end of an arm 12 of radius r, e.g., 8 feet, rotating at an angular velocity $\omega_c$. The gimbal system includes a C gimbal 15 rotating through an angle $\psi_c$ about a vertical axis perpendicular to the arm 12, an A gimbal 13 rotating through an angle $\phi_c$ about an axis in the plane of the C gimbal 15 and perpendicular to its axis, and a B gimbal 14 rotating through an angle $\theta_c$ about an axis in the plane of the A gimbal 13 and perpendicular to its axis.

Similar to the two gimbal system of FIG. 3, the three angles $\phi_c$, $\theta_c$, and $\psi_c$ are related to the transverse, lateral, and longitudinal acceleration components $G_{xc}$, $G_{yc}$, and $G_{zc}$ and the roll, pitch, and yaw angular velocities $p_c$, $q_c$, and $r_c$ experienced by motion base pilots through the following equations:

$$G_{xc} = X \cos \theta_c - Y \sin \phi_c \sin \theta_c + G_{vc} \cos \phi_c \sin \theta_c. \quad 7.$$

$$G_{yc} = Y \cos \phi_c + G_{vc} \sin \phi_c. \quad 8.$$

$$G_{zc} = -X \sin \theta_c - Y \sin \phi_c \cos \theta_c + G_{vc} \cos \phi_c \cos \theta_c. \quad 9.$$

$$p_c = \dot{\phi}_c \cos \theta_c + (\omega_c + \dot{\psi}_c) \cos \phi_c \sin \theta_c \quad 10.$$

$$q_c = \dot{\theta}_c - (\omega_c + \dot{\psi}_c) \sin \phi_c \quad 11.$$

$$r_c = -\dot{\phi}_c \sin \theta_c + (\omega_c + \dot{\psi}_c)(\cos \phi_c \cos \theta_c). \quad 12.$$

where $$X = G_{rc} \sin \psi_c + G_{tc} \cos \psi_c, \text{ and} \quad 13.$$

$$Y = G_{rc} \cos \psi_c - G_{tc} \sin \psi_c. \quad 14.$$

Various existing motion bases, such as a short arm vertifuge device or a long arm centrifuge, both manufactured by Emro Engineering Corporation, are suitable for the purposes of a two or three gimbal system. "Vertifuge" is a trademark of Emro Engineering Corporation for a short armed two or three gimbal device. Centrifuge is a generic term for a long arm two or three gimbal device. The short arm two or three gimbal vertifuge device is well suited for conveying the angular motions associated with spatial disorientation and unusual attitudes experienced by pilots in a low-G environment or without the stress of high-G environment. Conversely, the long armed two- or three-gimbal centrifuge is well suited for conveying the linear forces associated with a high-G environment, while at the same time retaining most of the angular capabilities of the short arm vertifuge device.

C. An Existing Control Process for a Motion Base System

The above incorporated U.S. Pat. No. 4,751,662 to Crosbie discloses a process for controlling a two-gimballed motion base system.

The '662 patent discloses derivation of the following equation for the angular velocity of the arm from equations 1–6:

$$wc = \sqrt[4]{(g^2/r^2)(G_a^2 - 1)} \quad 15.$$

where $G_a = \sqrt{G^2xa + G^2ya + G^2za}$ and where g is 32.16 ft/sec$^2$ and r is the radius of the arm in feet.

The '662 patent further derives the following equations for control of the A and B gimbals:

$$A: \phi_c = \sin^{-1} \frac{Gya}{Grvc} - (\tan^{-1} G_{rc}) \frac{1}{k_1 S + 1} + k_2 Pa' \quad 16.$$

where $G_{rvc} = \sqrt{G^2rc + G^2_{vc}}$, and where $k_1$ and $k_2$ are roll coefficients.

$$B: \theta_c = \sin^{-1} \frac{Gxa}{Gxza} + \sin^{-1} \frac{Gtc}{Gxza} - \frac{k_3}{k_4 S + 1} + k_5 Qa' \quad 17.$$

where Pa' and
Qa' are washed out roll and pitch angular velocites of the vehicle, respectively where $G_{xza} = \sqrt{G^2xa + G^2za}$ and where Pa' and Qa' are washed out roll and pitch angular velocities of the vehicle, respectively.

The transfer functions $1/(k_1 S + 1)$ and $k_3/(k_4 S + 1)$ are further described in Crosbie, R. J. & Kiefer, D. A., "Controlling the Human Centrifuge as A Force and Motion Platform for the Dynamic Flight Simulator", Proceedings of AIAA Flight Simulation Technologies Conference, St. Louis, Mo., Jul. 22–24, 1985.

The above equations were further modified by the introduction of a bias function 115 around the +1 G level to minimize artifacts, as shown in FIGS. 5(a) and 7. FIG. 5(a) shows how $G_{za}$ was modified when driving the motion base system according to the bias function of the '662 patent. When motion base system command signals achieve a match between the component linear accelerations in the aircraft and those in the motion base system, $G_{za}$ of the simulated aircraft is modified by the output signal Q of a function generator according to the graph. When $G_{za}$ is at 1.0 G (for example during straight and level flight) the motion base system operates at a $G_{zc}$ of 1.55 G, i.e., with a bias of 0.55 G. When $G_{za}$ is at 2.5 G and above (for example, during a pull-up maneuver) the motion base system $G_{zc}$ matches that of the aircraft. FIG. 5(a) also shows that the motion base system $G_{zc}$ will never go below approximately 1.05 G.

However, the device of the '662 patent has several limitations. It cannot simulate negative-G flight, i.e., flight where a pilot experiences a sustained $G_z$-force in the negative direction. Furthermore, the device of the '662 patent can only be a two-gimbal device with one cockpit orientation, i.e., the upright facing tangential position, as shown in FIG. 6. FIG. 6(a) shows a circular motion path 117 of a pilot 118 of the motion base system around a central point. Pilot 118 travels on circular path 117 in a cockpit (not shown) on an end of arm 12. The cockpit, and, therefore, the pilot are orientated in an upright facing tangential orientation when the gimbals are in a starting position.

The device of the '662 patent also experiences discontinuities in the gimbal drive circuitry, jolting pilot 118 during quick arm accelerations. In addition, the '662 patent process does not have a means for dynamically optimizing the gimbal motions that are used to negate the motion base generated artifacts during non-steady state flight. (Motion base artifacts are non-desirable "side effect" perceptions experienced by the pilot due to motion base system motion.) The '662 patent algorithm also does not simulate the yaw perception of a pilot.

Furthermore, the device of the '662 patent was designed to simulate only aircraft. Therefore, it treats $G_z$ as the primary linear acceleration, and also does not take into account the possibility that other types of vehicles such as race cars, may not have $G_z$ as their primary linear acceleration.

D. An Existing Pilot Perceptual Model for a Motion Base System

Above incorporated U.S. Pat. No. 4,751,662 to Crosbie also discloses a pilot perceptual model for an aircraft and for a motion base. The aircraft and motion base perceptual models of the '662 patent are used to determine pitch and roll sensations experienced by pilots in the aircraft and by pilots in the motion base system respectively. (Because the system disclosed by the '662 patent does not simulate yaw perceptions, the model does not determine yaw sensations). The perceptual models of the '662 patent are used to fine-tune the motion base control process so that a motion base system pilot experiences substantially the same pitch and roll sensations as an aircraft pilot performing a same maneuver.

As shown in FIG. 7, an on-line computer 18 programmed with the above listed Equations (15), (16), and (17) receives signals D, E and Q, where D represents $G_{xa}$, $G_{ya}$, and $G_{za}$; E represents the washed out angular velocities $P_a'$, $Q_a'$, and $R_a'$; and Q represents a bias function of $G_z$, and signals indicative of the arm radius r and gravity g, to produce control signal F, including arm rotation $\omega_c$, pitch $\theta_c$ and roll $\phi_c$, which connects and drives a motion base system 19. The angular motion and linear forces imparted to a pilot within the motion base system 19 stimulate his visual, proprioceptive and physiological receptors to which he responds by generating control signals A, thus forming a closed loop control system.

Control signals D and E also connect to the input of an on-line computer 21 programmed to generate signals H and I indicative of the perceived roll $\phi'_a$ and pitch $\theta'_a$ angular motions predicted for the pilot in actual flight of the simulated aircraft. The equations for these predicted angular motions, experimentally derived on a human centrifuge and reported in an article by Crosbie, R. J. entitled "Application of Experimentally Derived Pilot Perceptual Angular Response Transfer Functions", Proceedings of the AIAA Flight Simulators Technologies Conference and Technical Display, AIAA-83-1100-CP, Jun. 13-15, 1983: Niagra Falls, N.Y., are as follows:

$$H = \phi_a' = \phi_{aa}' + \phi_{va}' \qquad (18)$$
$$= \frac{P_a'}{G_{totad} + 1} \cdot \frac{12.48}{(S + 10)(S + 5)} +$$
$$\frac{G_{totad} \phi_{va}}{G_{totad} + 1} \cdot \frac{6.66 (S + .75)}{(S + 10)(S + .5)}$$

-continued where $G_{totad}$ = 1 when $G_{tota} < 1$
= $G_{tota} (1/1 + S)$ when $G_{tota} \geq 1$, and $$\phi_{va} = \sin^{-1} \frac{(G_{ya})}{(G_{yza})}$$

$$I = \theta_a' = \theta_{aa}' + \theta_{va}' \qquad (19)$$
$$= \frac{Q_a'}{G_{totad} + 1} \cdot \frac{12.48}{(S + 10)(S + 2.5)} +$$
$$\frac{G_{totad} \phi_{va}}{G_{totad} + 1} \cdot \frac{2.66 (S + .75)}{(S + 10)(S + .2)}$$

where $\theta_{va} = \sin^{-1} \frac{(G_{xa})}{(G_{xza})}$ where $P_a'$ and $Q_a'$ are "washed out" roll and pitch angular velocities of the vehicle, repsectively The first terms $\phi'_{aa}$ and $\theta'_{aa}$ in Equations (18) and (19) represent the pilot's perceived angular displacement of the simulated aircraft due to pure roll and pitch, respectively; the second terms $\phi'_{va}$ and $\theta'_{va}$ represent the pilot's perceived angular displacement of the acceleration vector in the simulated aircraft about the roll and pitch axes, respectively.

Sensors 22 attached to the motion base system 19 sense the actual transverse, lateral and longitudinal accelerations $G_{xc}$, $G_{yc}$, and $G_{zc}$ and the roll and pitch angular velocities $p_c$ and $q_c$. Sensor output signals J and K corresponding to these parameters are applied to the input of an on-line computer 23, programmed like computer 21, to generate signals L and M indicative of the perceived angular motions of roll $\phi'_c$ and pitch $\theta'_c$ predicted for the motion base system pilot for the same flight command signals C. The equations for signals L and M, derived like Equations (18) and (19), are as follows:

$$L = Q_c' = \phi_{ac}' + \phi_{vc}' \qquad (20)$$
$$= \frac{\phi_c}{G_{totad} + 1} \cdot \frac{12.48}{(S + 10)(S + 5)} +$$
$$\frac{G_{totad} \phi_{vc}}{G_{totad} + 1} \cdot \frac{6.66 (S + .75)}{(S + 10)(S + .2)}$$

where P'c is a washed out Pc $$M = Q_c' = \theta_{ac}' + \theta_{vc}' \qquad (21)$$
$$= \frac{\theta'_c}{G_{totad} + 1} \cdot \frac{12.48}{(S + 10)(S + 2.5)} +$$
$$\frac{G_{totad} \theta_{vc}}{G_{totad} + 1} \cdot \frac{2.66 (S + .75)}{(S + 10)(S + .2)}$$

where Q'c is a washed out Qc

The first terms $\phi'_{ac}$ and $\theta'_{ac}$ in Equations (20) and (21) represent the pilot's perceived angular displacement of the motion base system due to pure roll and pitch, respectively; the second terms $\phi'_{vc}$ and $\theta'_{vc}$ represent the pilot's perceived angular displacement of the acceleration vector in the motion base system about the roll and pitch axes, respectively.

The aircraft and motion base system perceived roll angles $\phi'_a$ and $\theta'_c$ in signals H and L are compared and the absolute value of their differences, integrated over a period of time T, are added to a weighting function in a roll comparator 26 to produce signal N at an indicator 28. Also the perceived aircraft and motion base system pitch angles $\phi'_a$ and $\theta'_c$ in signals I and M are compared and the absolute value of their differences, integrated over the time T, are added to a weighting function in a pitch comparator 27 to produce signal P at an indicator 29. The computations are mathematically expressed in accordance with the following equations:

$$\Sigma\phi' = |\Delta\phi'| + Wy|\Delta Gy| \qquad 22.$$

$$= \frac{1}{T}\int_O^T |\phi_a' - \phi_c'|dt +$$

$$Wy\left[\frac{1}{T}\int_O^T |Gya - Gyc|dt\right]$$

$$\Sigma\theta' = |\Delta\theta'| + Wx|\Delta Gx| \qquad 23.$$

$$= \frac{1}{T}\int_O^T |\theta_a' - \theta_c'|dt +$$

$$Wx\left[\frac{1}{T}\int_O^T |Gxa - Gxc|dt\right]$$

The second term in each Equation (22) and (23), which is the weighting function, determines the relative influence of angular motion and linear acceleration to the pilot's perception. Therefore, weighting factors $W_y$ and $W_x$ are varied according to the individual pilot's preference to either of these influences. These factors are usually substantially equal to zero and, therefore, are often neglected.

The above-described '662 patent perceptual model has some limitations, however. As previously stated, it does not determine yaw perceptions and it can not predict pilot perceptions during negative G flight. Its roll perception determination is somewhat inaccurate because roll perception depends somewhat on a perceived yaw In addition, it cannot predict the effects due to cockpit orientations other than upright facing tangential or due to the motions of a third gimbal, such as the C gimbal of FIG. 4.

Furthermore, it is designed to simulate perceptions of aircraft pilots only. Therefore, it treats $G_z$ as the primary linear acceleration, and does not take into account the possibility that other types of vehicles, such as automobiles, may have other primary accelerations.

SUMMARY OF THE INVENTION

The present invention can be used to control either a short arm vertifuge device or a long arm centrifuge having a number of gimbals less than or equal to three.

It is an object of the invention to control a motion base system to replicate the visual, physiological, and proprioceptive sensations such as those experienced by a pilot in a high speed aircraft or by operators of other types of vehicles.

It is a further object of the invention to use the three acceleration vectors of a simulated vehicle and the three angular velocities of the simulated vehicle to approximate the three linear accelerations and to recreate the physiologic sensations of pitch, roll, and yaw.

It is a still further object of the invention to simulate the linear forces of a vehicle in the Cartesian planes using all of the forces of the motion base, i.e. the tangential, radial, and vertical force vectors, in concert with appropriate gimbal motions.

It is a still further object of the invention to simulate continuous pitch, roll, and yaw by combining the force vectors of the motion base system with additional gimbal rotations.

It is a still further object of the invention to control a third (yaw) gimbal interactively with the linear forces of a simulated vehicle to offload the excursion requirements of the commanded pitch ad roll gimbals.

To achieve the objects and in accordance with the purpose of the invention, as embodied and broadly described herein, the invention comprises: a process for generating an angular velocity of an arm of a gimballed motion base system substantially duplicating operator perceptions from a vehicle simulation, the process comprising the steps of: receiving a linear force vector of the simulated vehicle, the linear force vector having Gx, Gy, and Gz components; computing a first angular velocity from the linear force vector and a radius of the arm; receiving a yaw angular velocity of the simulated vehicle; attenuating the yaw angular velocity; filtering the attenuated yaw angular velocity with a washout filter to produce a filtered yaw angular velocity; setting a second angular velocity according to a type of the motion base system and the filtered yaw angular velocity; and computing the angular velocity of the arm from the first angular velocity and the second angular velocity.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of the specification illustrate several embodiments of the invention and together with the description, serve to explain the principles of the invention.

DESCRIPTION OF THE PREFERRED EMBODIMENTS

A. General Discussion

Reference will now be made in detail to the present preferred embodiments of the invention, examples of which are illustrated in the accompanying drawings. Wherever possible, the same reference numbers will be used throughout the drawings to refer to the same or like parts.

The present invention overcomes the problems and disadvantages of the prior art by improving upon the process of the '622 patent in the following ways:

1) incorporating a control process to account for the effect of yaw on the motion of the arm of the system;

2) incorporating a limited-G bias function for controlling a motion base system capable of producing only a limited G range;

3) incorporating a low-G bias function for controlling a motion base system simulating forces between approximately 0.5 G and 2.0 G;

4) separating the pitch, roll, and yaw gimbals, and arm drive circuitry, thus eliminating artifacts, providing more versatility in tuning the controls of the motion base by providing independent filtering adjustments to any one circuit without interfering with the other circuits.

5) improving the computation time involving the command of the angular velocity of the arm ($\psi_c$) and the position of the A, B, and C gimbals, thus providing improved phasing in the response of the gimbal and arm drive motors.

6) incorporating a negative-G process for simulating sustained negative Gz, including a process for simulating the transition between positive and negative Gz flight regimes.

7) allowing various baseline yaw gimbal (C gimbal) positions;

8) allowing various cockpit orientations; and 9) adding an interactive yaw gimbal (C gimbal) control process.

Treating $G_{TOTAL}$, instead of $G_z$, as a primary linear acceleration vector allows a wider variety of vehicles such as aircraft, race cars, and speed boats to be simulated.

The present invention also improves upon the pilot perceptual model of the '622 patent by:

1) incorporating yaw perception; and 2) accounting for the fact that a Gy component of linear acceleration affects both roll perceptions and yaw perceptions.

Figure 1:
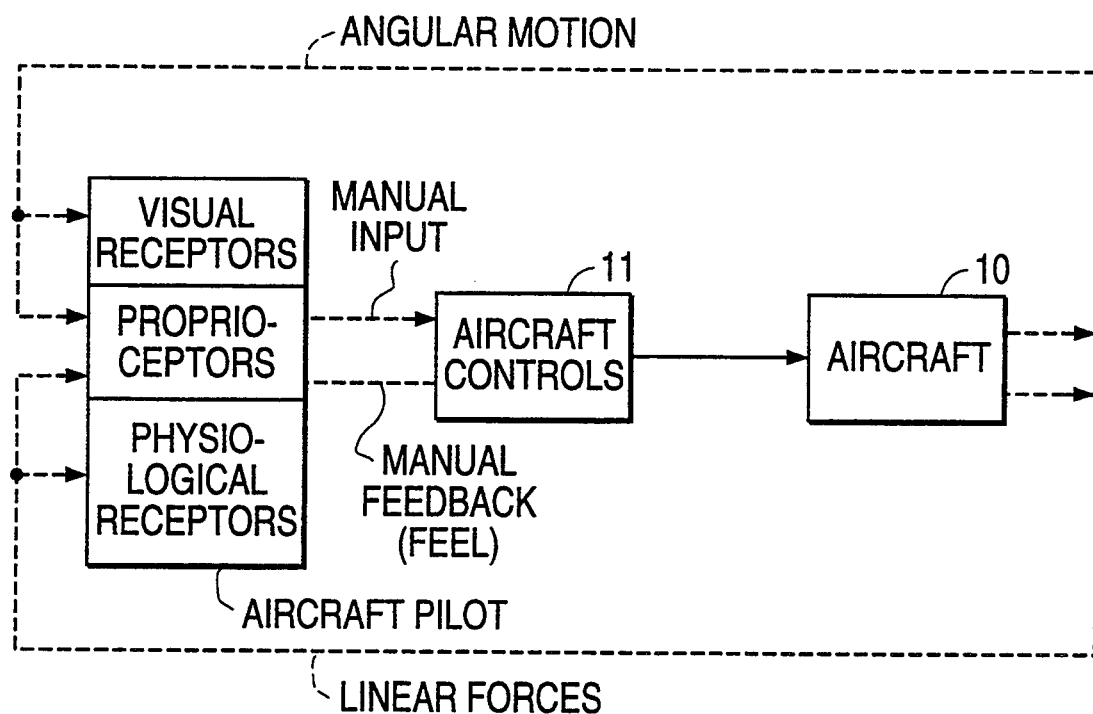
FIG. 1 is a diagrammatic representation of angular motions and linear force stimuli and their receptors in a closed-loop human sensing system for a vehicle operator.
Figure 2A:
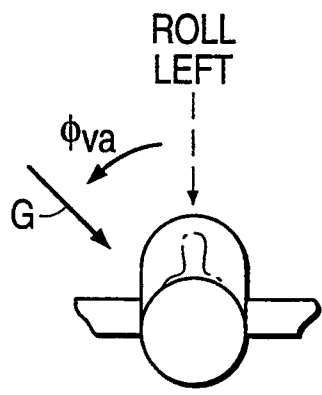
FIG. 2(a) is a diagrammatic representation of angular and vector rotations perceived by a vehicle operator about his roll axis during pure vector rotation.
Figure 2B:
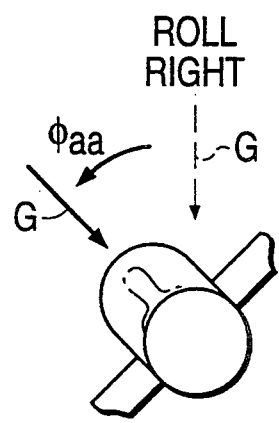
FIG. 2(b) is a diagrammatic representation of angular and vector rotations perceived by a vehicle operator about his roll axis during pure angular rotation.
Figure 2C:
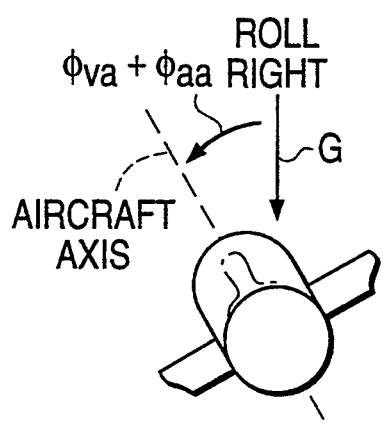
FIG. 2(c) is a diagrammatic representation of angular and vector rotations perceived by a vehicle operator about his roll axes during combined angular and vector rotations.
Figure 3:
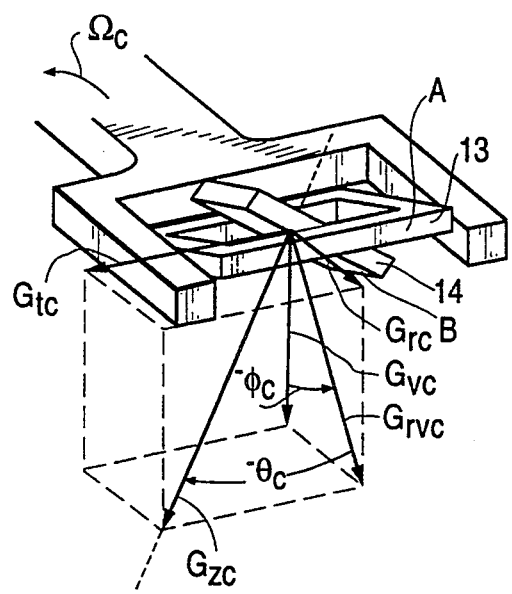
FIG. 3 is a diagrammatic representation of a two gimbal motion base system.
Figure 4:
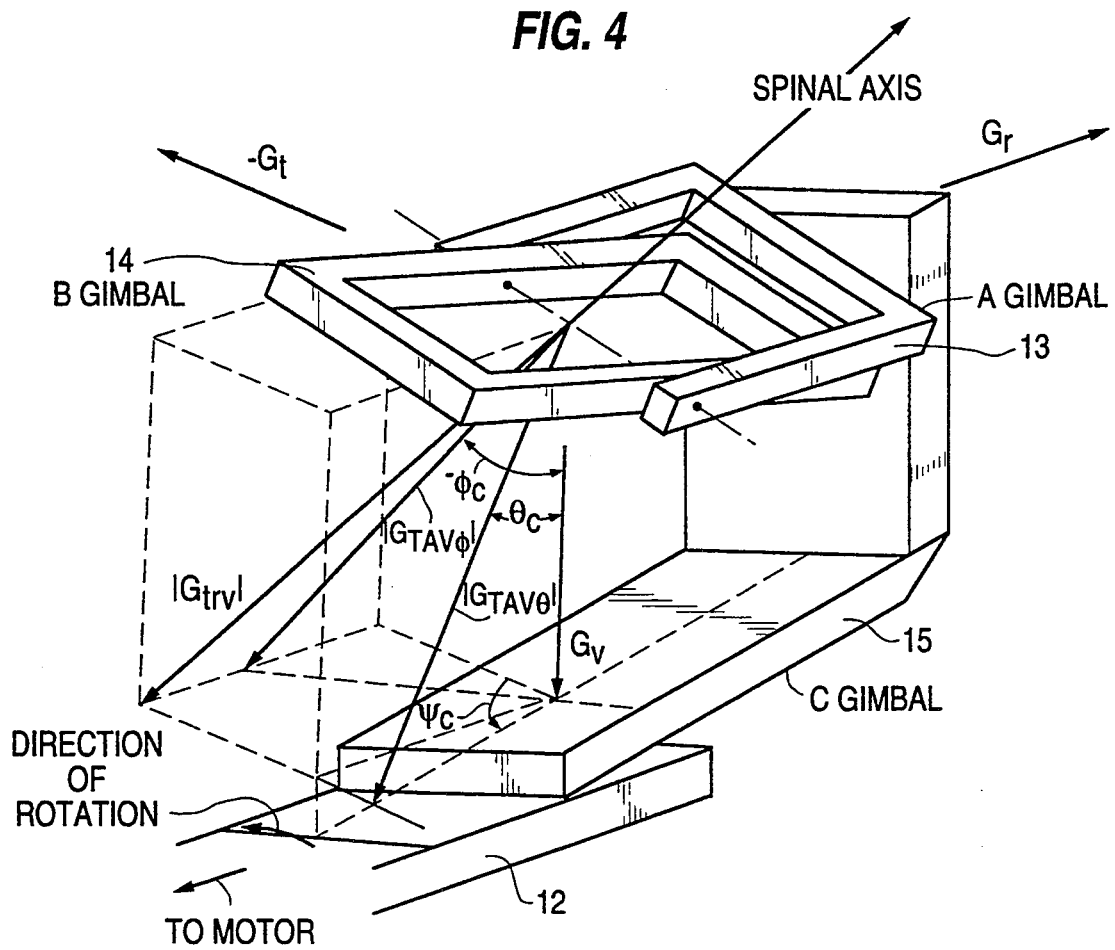
FIG. 4 is a diagrammatic representation of a three gimbal motion base system.
Figure 10A:
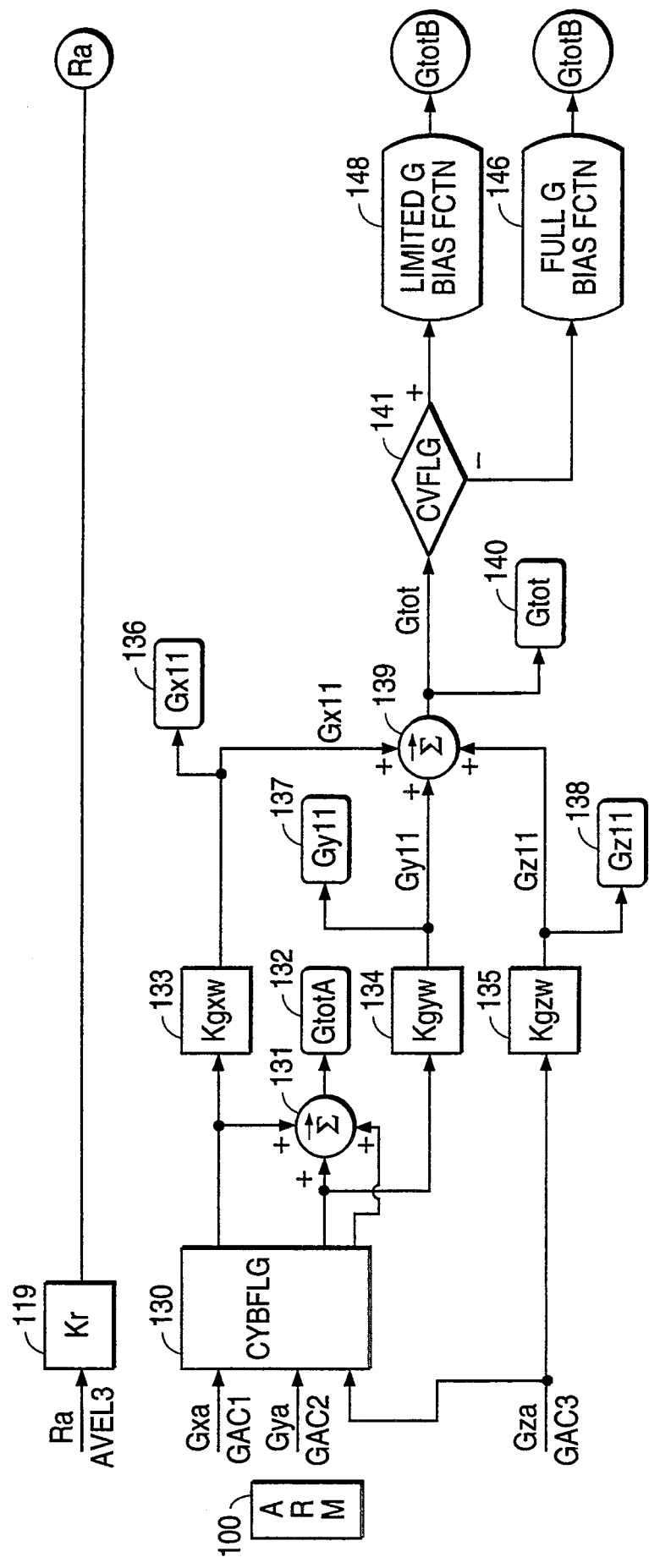
FIGS. 10(a) and 10(b) are flow diagrams of an arm control subprocess of a preferred embodiment of the present invention.
Figure 10B:
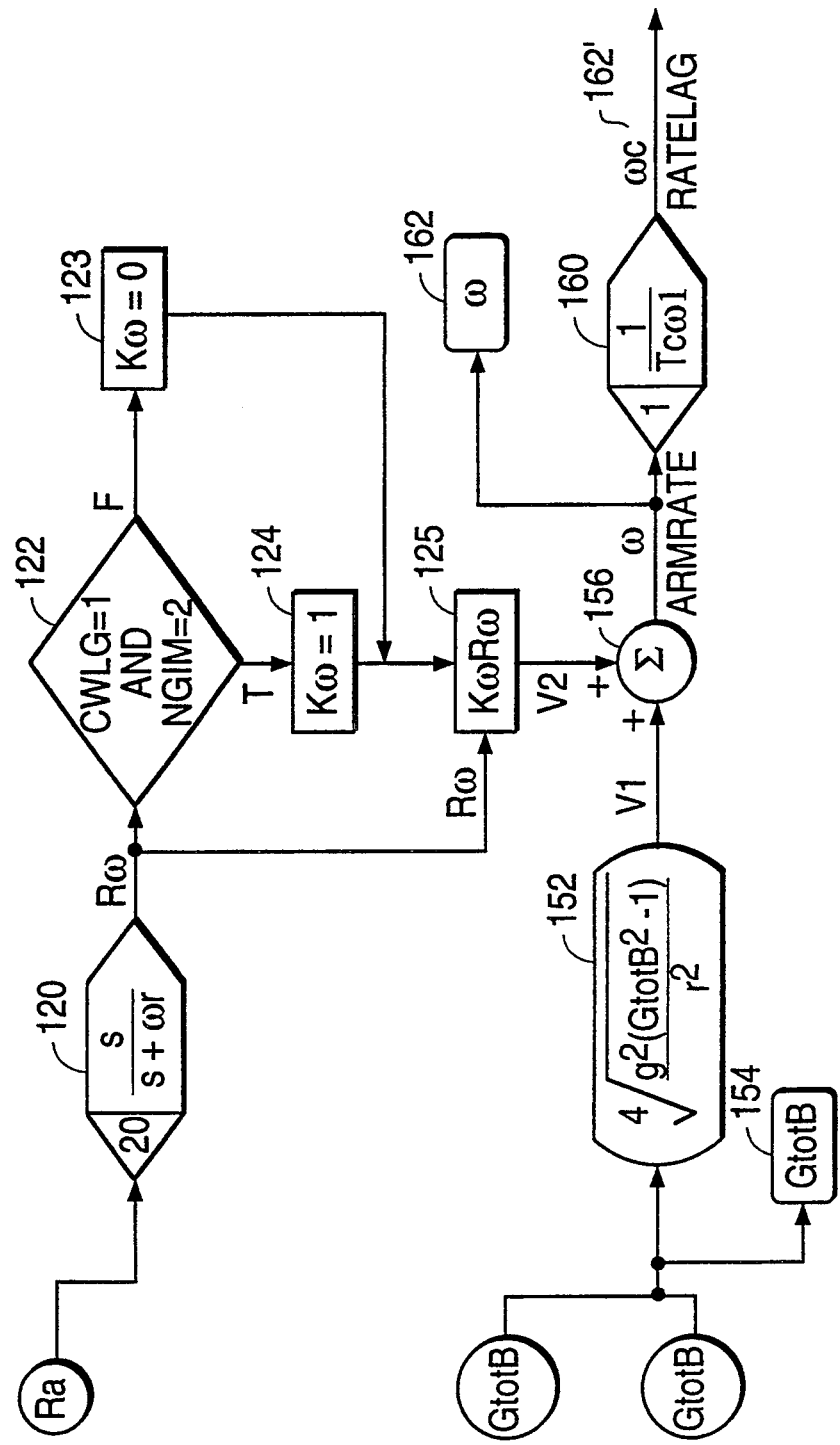
Figure 11A:
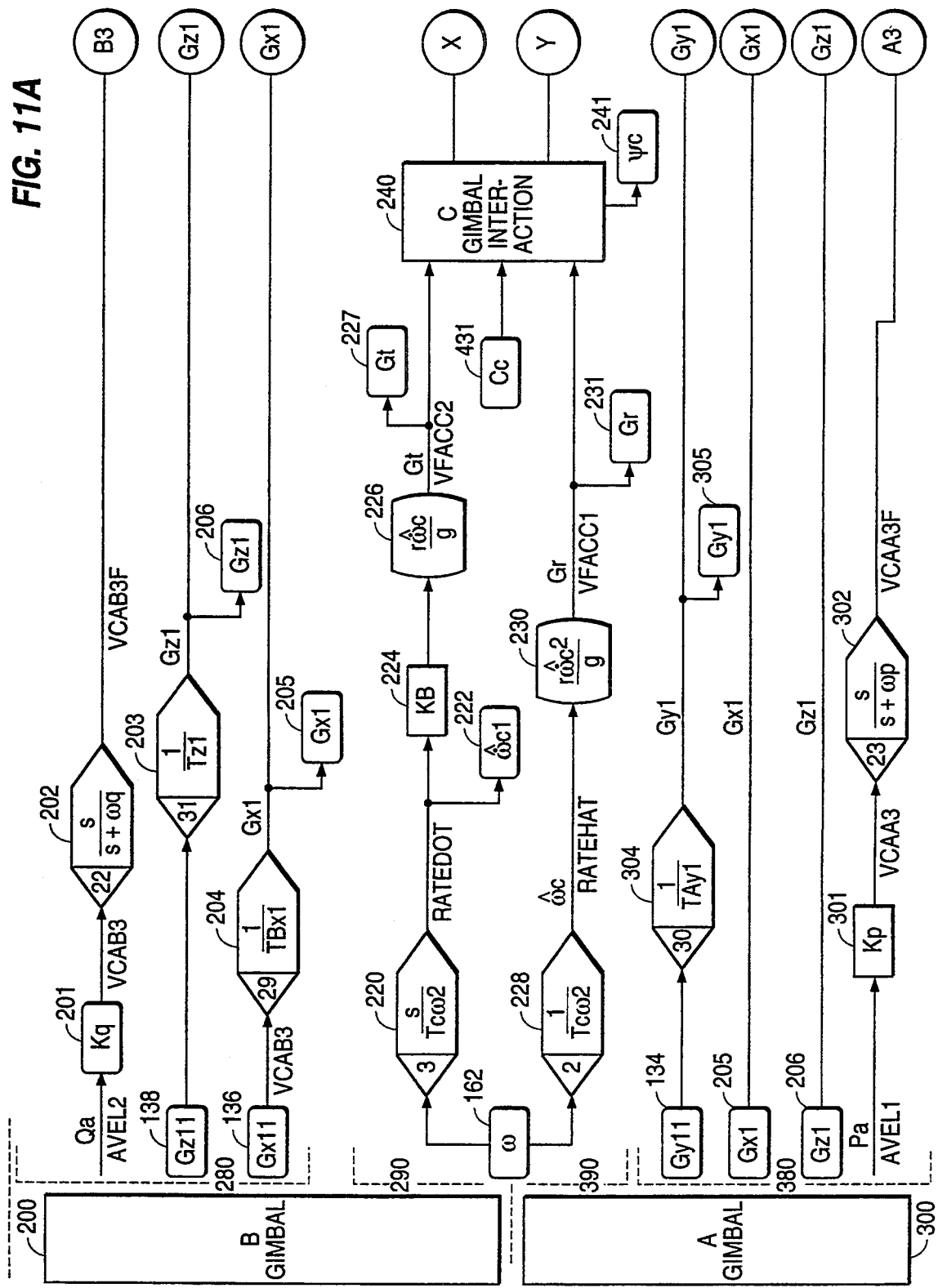
FIGS. 11(a) and 11(b) are flow diagrams of a B gimbal drive subprocess and an A gimbal drive subprocess of a preferred embodiment of the present invention.
Figure 11B:
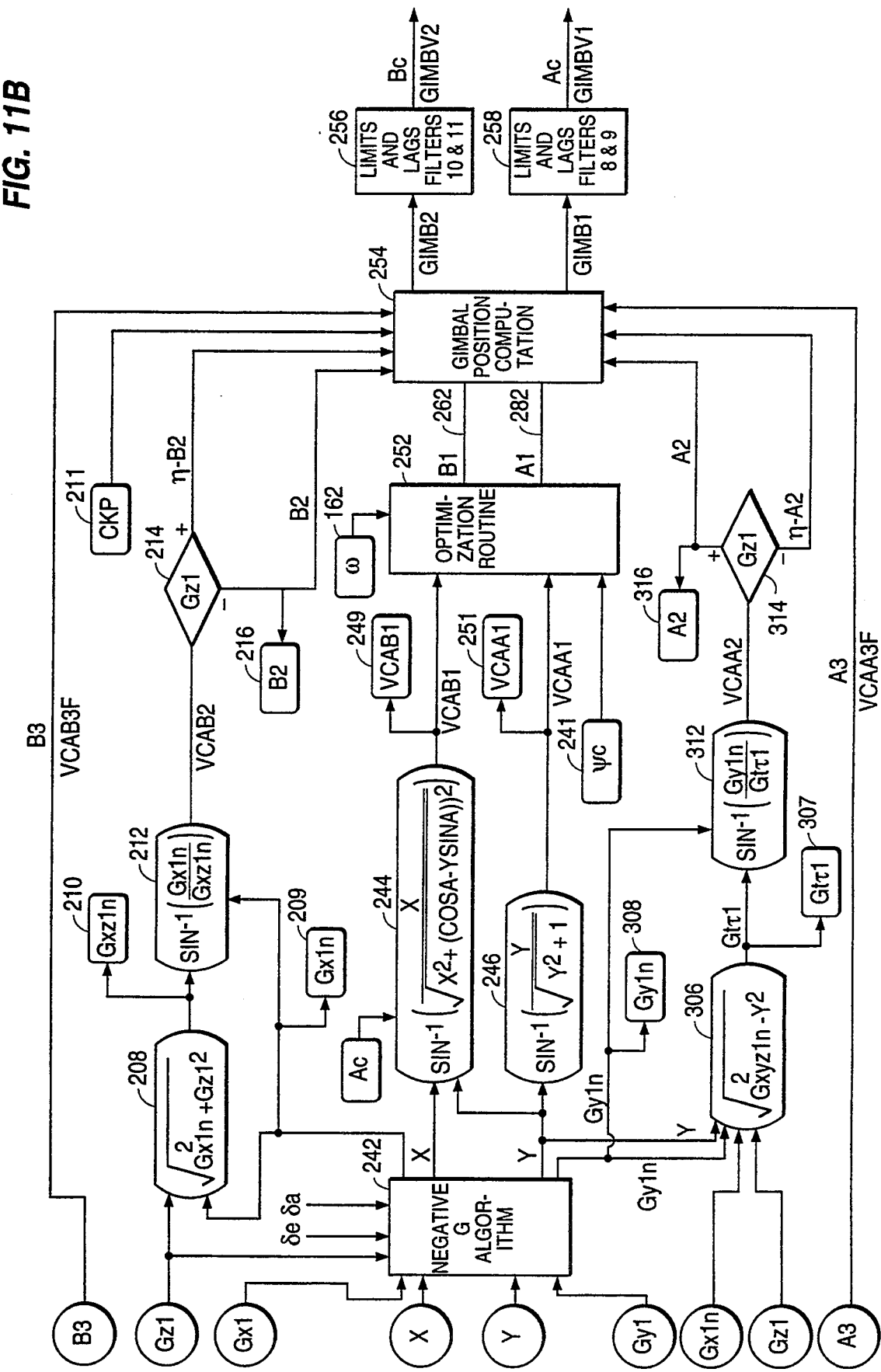
Figure 12:
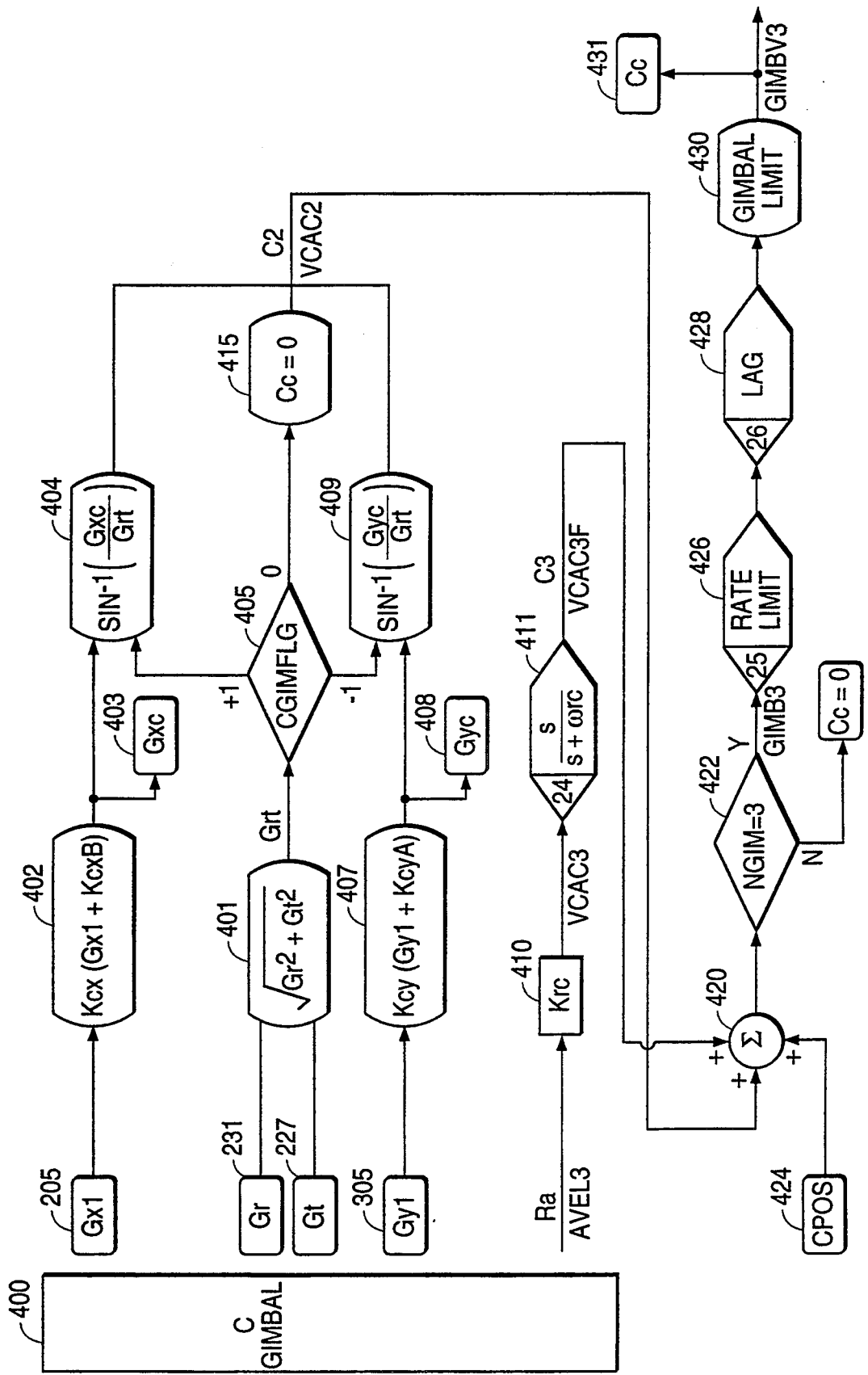
FIG. 12 is a flow diagram of a C gimbal drive subprocess of a preferred embodiment of the present invention.

FIGS. 10-12 are flow diagrams showing gimbal and arm control subprocesses of a preferred embodiment of the present invention. It should be understood that, even though FIGS. 10-12 show a control process for a three gimbal system having an arm moving in an angular motion, the present invention may be adapted for a wide range of motion base system configurations such as: a) a one gimbal system, b) a two gimbal system with the B gimbal fixed in place, c) a two gimbal system with the B gimbal and the arm fixed in place or moving at a constant rate, d) a two gimbal system with only the arm fixed in place or moving at a constant rate, e) a three gimbal system having the arm fixed in place or moving at a constant rate, f) a three gimbal system having the C gimbal fixed in place, and g) a three gimbal system having the B gimbal fixed in place. The present invention has been adapted for each of the above-mentioned configurations. However, the above-mentioned configurations are exemplary only and other motion base system configurations usable with the present invention will be obvious to a person of ordinary skill in the art. For example, the present invention could also be used to control a vertical motion base system having an arm moving in a vertical direction instead of angularly. Such a modification would involve changes to the equations of motion described in connection with FIG. 4 so that the equations describe linear motion instead of angular motion.

The control process of the present invention is designed to simulate the six degrees of freedom of a moving vehicle in flight or when attached to the earth on a motion base system with two, three, or four degrees of freedom. Note, however, that the less capability a motion base has, the smaller the flight regime or other motion regime that can accurately be simulated.

It is not the intention of the present invention to accurately recreate the three linear accelerations ($G_{xa}$, $G_{ya}$, and $G_{za}$) and the three angular accelerations Pa, Qa, and $\dot{R}_a$ of a moving vehicle. This is physically impossible because the motion base system is attached to the earth at its base and rotates about a fixed radius and cannot physically duplicate the maneuvers of a high performance aircraft or of other moving vehicles that are not so constrained.

Nor is it an intent of the invention to accurately recreate the three linear accelerations of a moving vehicle during a transition from one G level to another. The angular motions required of the gimbal system to achieve the accuracy in the linear force environment could be substantially unrelated to those of the simulated vehicle. This would result in the simulator operator receiving unrealistic angular motion cues which would significantly interfere with his ability to control the simulator. Also, the motion base may be limited in its ability to generate the full magnitude of the linear acceleration requirement. Rather, it is an intent of the invention to recreate an environment within the capability of the motion base which compromises the linear acceleration requirement of a moving vehicle in order to provide the simulator operator with the perception of more angular motion realism.

Figure 8A:
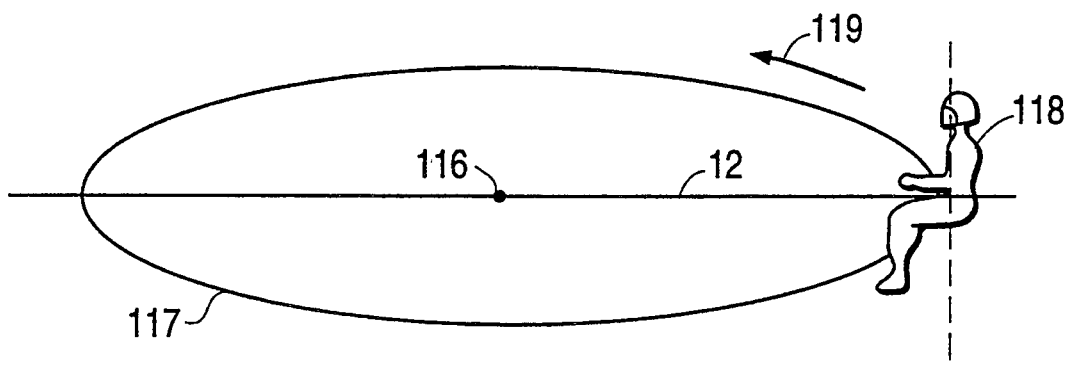
FIG. 8(a) is a diagrammatic representation of a motion base cockpit in an upright facing inward orientation.
Figure 8B:
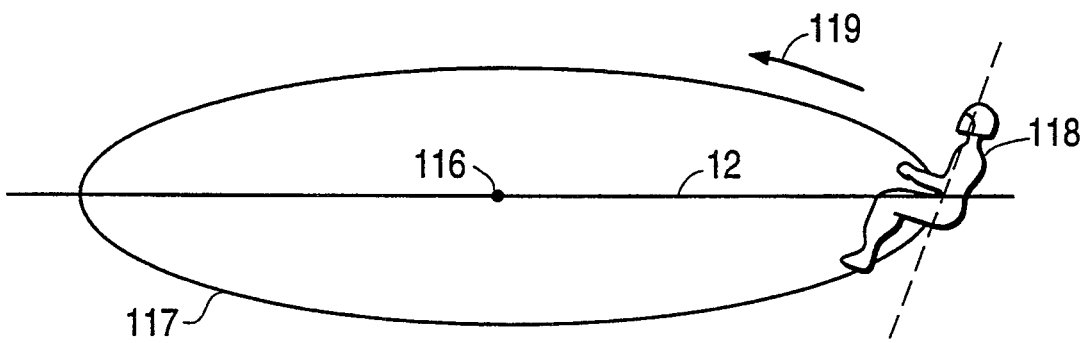
FIG. 8(b) is a diagrammatic representation of the motion base cockpit of FIG. 8(a) tilting outboard.
Figure 8C:
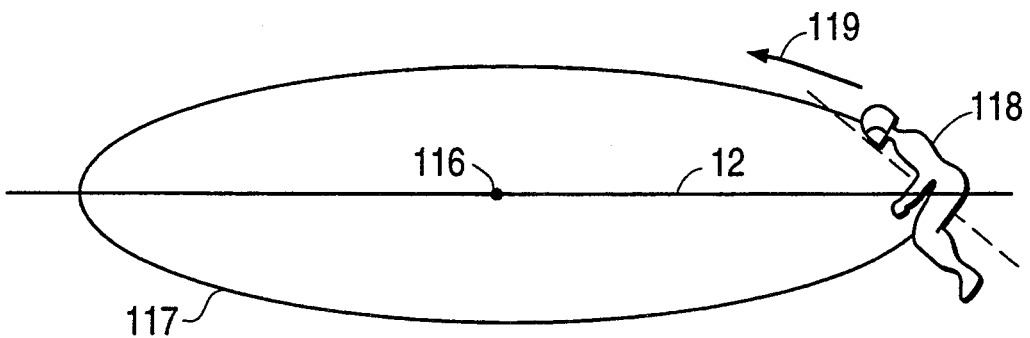
FIG. 8(c) is a diagrammatic representation of the motion base cockpit of FIG. 8(a) tilting inboard.

FIG. 8 shows an upright facing inward orientation of an operator 118 in a cockpit (not shown) of the motion base system. When the gimbals are in an initial position, the cockpit and operator 118 are rotated around center point 116 on motion path 117 in a direction 119 so that operator 118 is always facing toward center point 116, as shown in FIG. 8(a). Operator 118 may be tilted outboard or inboard as shown in FIGS. 8(b) and 8(c), respectively.

Figure 9A:
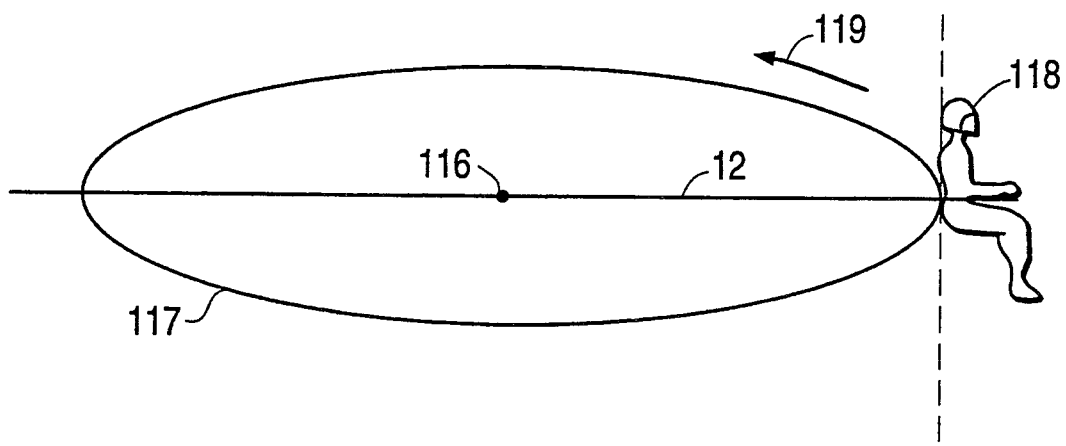
FIG. 9(a) is a diagrammatic representation of a motion base cockpit in an upright facing outward orientation.
Figure 9B:
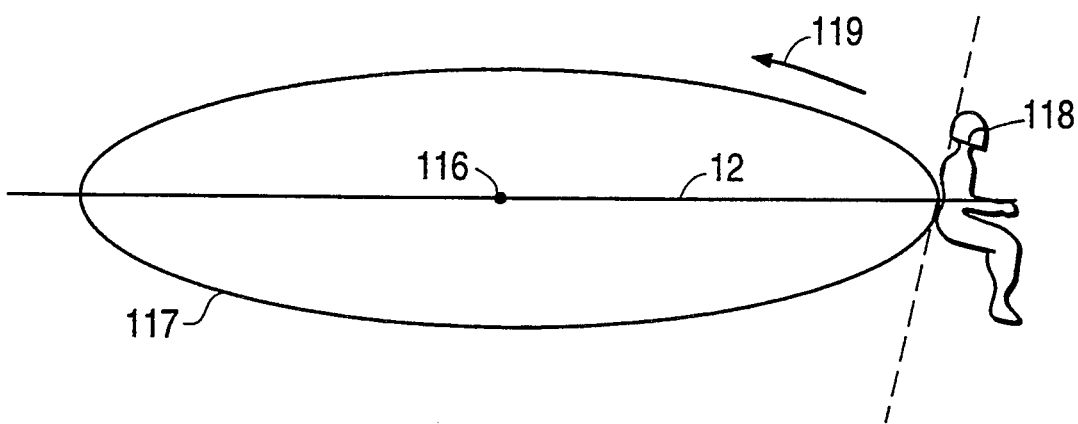
FIG. 9(b) is a diagrammatic representation of the motion base cockpit of FIG. 9(a) tilting outboard.
Figure 9C:
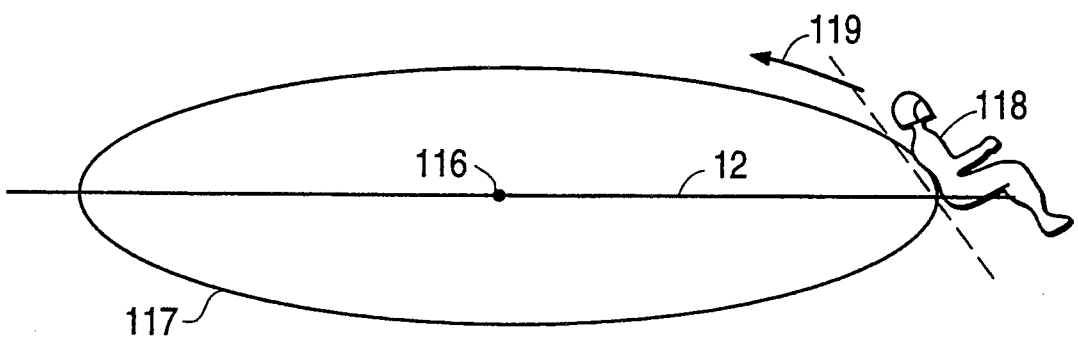
FIG. 9(c) is a diagrammatic representation of the motion base cockpit of FIG. 9(a) tilting inboard.

FIG. 9 shows an upright facing outward orientation of operator 118 in a cockpit (not shown) of the motion base system. When the gimbals are in an initial position, the cockpit and operator 118 are rotated around center point 116 on motion path 117 in direction 119 so that operator 118 is always facing away from center point 116, as shown in FIG. 9(a). Operator 118 may be tilted outboard or inboard as shown in FIGS. 9(b) and 9(c), respectively.

Figure 6A:
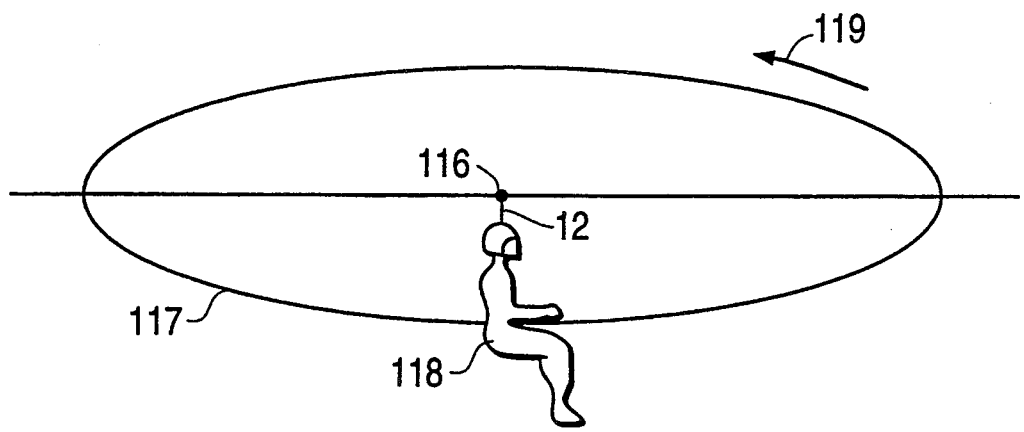
FIG. 6(a) is a diagrammatic representation of a motion base cockpit in an upright facing tangential orientation.
Figure 6B:
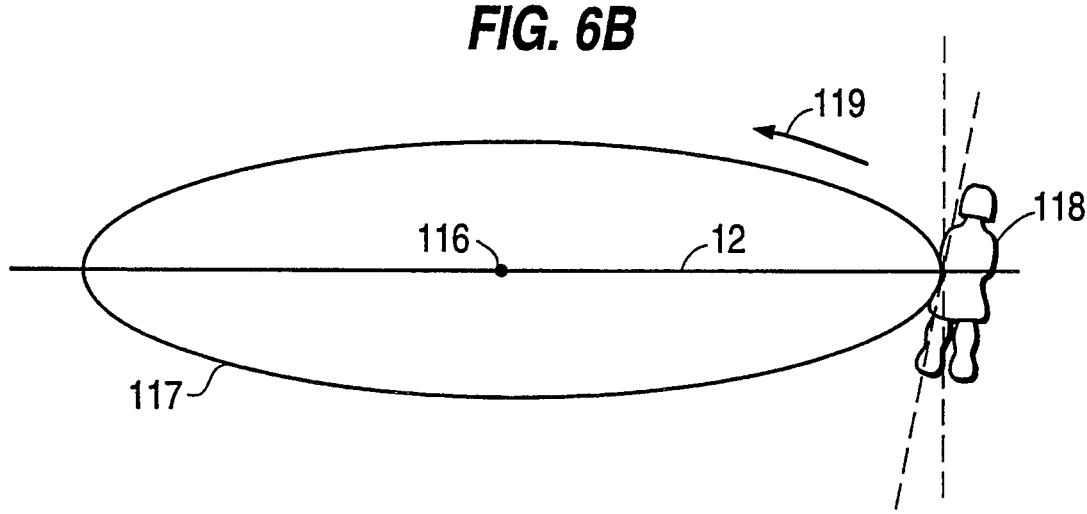
FIG. 6(b) is a diagrammatic representation of the motion base cockpit of FIG. 6(a) rotated ninety degrees counterclockwise and tilting outboard.
Figure 6C:
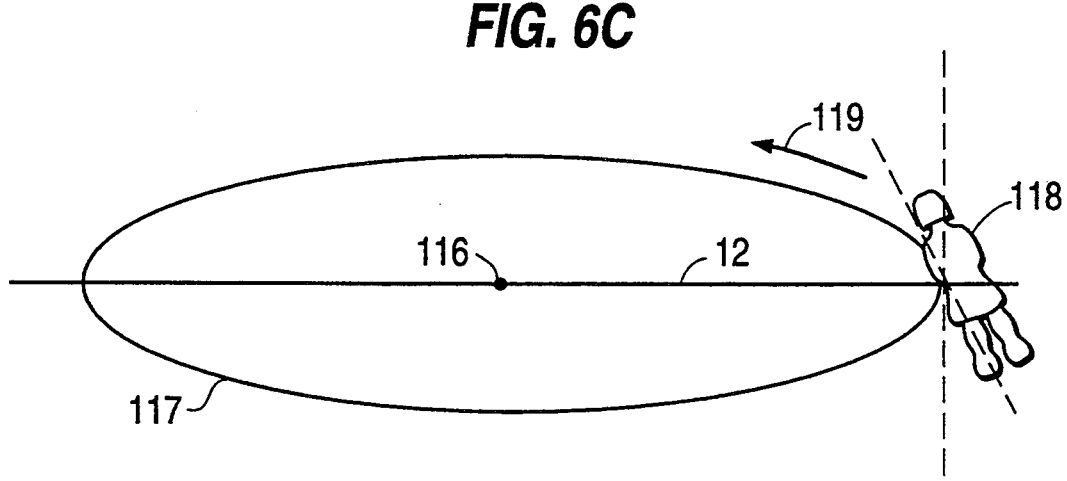
FIG. 6(c) is a diagrammatic representation of the motion base cockpit of FIG. 6(a) rotated ninety degrees counterclockwise and tilting inboard.

The present invention can control a two gimbal or a three gimbal system with a limited range of motion, where the cockpit is oriented and fixedly attached within the B gimbal (in a three gimbal system) in any of the three orientations shown in FIGS. 6(a), 8(a), and 9(a) or other orientations discussed below. In a two gimbal system, the cockpit itself may constitute a second gimbal, and the operator's seat within the cockpit is oriented as shown in FIGS. 6, 8 and 9. It is understood that not all motion base systems are capable of all three orientations and that, for a given motion base system configuration, only one or two orientations may be used. The upright facing tangential orientation of FIG. 6(a) is a traditionally used orientation. The upright facing inward orientation of FIGS. 8a-8c is preferably used, for example, in simulations requiring simulations of large $G_{xa}$ forces, such as simulating a catapulted takeoff from an aircraft carrier. The upright facing outward orientation is preferably used, for example, in simulations of aircraft spin conditions or in race car simulations where large negative $G_x$ accelerations are required during braking. This orientation also provides the proper angular motion cues during race car turns. All of these orientations may be tilted either outboard, as shown in FIGS. 6(b), 8(b), and 9(b), or inboard as shogun in FIGS. 6(c), 8(c), and 9(c), by rotating the roll gimbal as described in detail below. Other orientations (not shown) may include left side, right side, front side, backside, all of which may be oriented radially or tangentially. In a two gimballed system, cockpit orientation is determined by the primary force vector that the system is expected to simulate. In addition, cockpit orientation may be determined by the gimbal requirements of the simulated device. For example, one of pitch and roll, roll and yaw, pitch and yaw, may be optimal for simulating a particular device in a two gimbal system. For example, in simulating a catapult, the cockpit is initially oriented left side, facing tangential within the B gimbal because roll and yaw capabilities are primarily required for catapult simulation.

FIGS. 10-12 show four subprocesses of a preferred embodiment of the present invention: an arm drive subprocess 100, a B gimbal drive subprocess 200, an A gimbal drive subprocess 300, and a C gimbal drive subprocess 400. Arm drive subprocess 100 creates a linear force environment that the A, B, and C gimbals control and coordinate to yield a linear force environment and pitch, roll, and yaw sensations for a pilot in the motion base system. In a preferred embodiment, the processes of FIGS. 10-12 (and FIGS. 13, 15, and 17) are performed by a central microprocessor, having a memory. The microprocessor receives input from cockpit controls operated by a human being and which sends signal $\omega_c$ to the arm and position signals $A_c$, $B_c$, and $C_c$, to the A, B, and C gimbals, respectively. The location of the processor and the number of processors may vary in other embodiments of the invention.

B. The Arm Drive Subprocess

As shown in FIG. 10, the arm drive subprocess 100 has as inputs three linear force vectors of the moving vehicle to be simulated (also called linear acceleration components or linear acceleration vectors), $G_{xa}$, $G_{ya}$, and $G_{za}$, and a moving vehicle yaw rate (also called angular velocity) $R_a$. These values represent the vehicle movements to be simulated.

Arm drive subprocess 100 comprises a step 119, a filter step 120, a test step 122, a step 123, a step 124, a step 125, a step 130, a step 131, a step 132, a step 133, a step 134, a step 135, a step 136, a step 138, a step 139, a test step 141, a step 142, a limited G bias function step 148, a full G bias function step 146, a step 152, a step 156 and filter step 160.

Vehicle yaw rate $R_a$ input to the arm drive subprocess allows control of yaw perception via arm 12. This subprocess is useful in a three gimbal device, or in a two gimbal device where the cockpit is oriented inboard, as shown in FIG. 8, or outboard, as shown in FIG. 9. In step 119, yaw rate $R_a$ is scaled by a predetermined constant $K_R$, for example, 0.4. Filter step 120 incorporates a washout filter with a time delay of $\omega_r$ (e.g. one instead of yaw rate $R_a$. Step 122 preferably tests whether the second). After approximately three seconds without a change in the yaw rate, filter step 120 begins outputting a "0" value instead of yaw rate $R_a$. Step 122 preferably tests whether the current motion base system is a three gimbal device and whether the operator is oriented in a substantially upright position. If one or both of these conditions is false, control passes to step 123 where a constant $k_\omega$ is set to "0." If both conditions are true, control passes to step 124 where $K_\omega$ is set to "1." In step 125, a value $R_\omega$ is multiplied by $K_\omega$ to yield an angular velocity v2.

The $G_{xa}$, $G_{ya}$ and $G_{za}$ components first pass through step 130. Step 130 is only performed for a two gimbal system, because in a three gimbal system, cockpit orientation is achieved by movement of the yaw gimbal, and the effect of yaw gimbal motion is accounted for elsewhere in the process. In step 130, $G_{xa}$ and $G_{ya}$ are scaled by the constant $+1.0$, when the operator is oriented facing forward tangentially. Alternately, $G_{xa}$ and $G_{ya}$ are scaled by the constant $-1.0$ when the operator is oriented facing backward tangentially. When the operator is oriented leftside down, facing forward, then $G_{xa}$ is scaled by a constant of $+1.0$ and $G_{ya}$ and $G_{za}$ are both scaled by a constant of $-1.0$ and the values of $G_{xa}$ and $G_{za}$ are interchanged. When the cockpit is initially oriented facing inboard or outboard, left side, right side, front side, or backside, then $G_{xa}$, $G_{ya}$, and $G_{za}$ are variously scaled and interchanged in step 130 to reflect the $G_xG_yG_z$ forces on the operator. In a preferred embodiment, the cockpit is upright facing tangential, the arm is turning counterclockwise and step 130 scales $G_{xa}$, $G_{ya}$, and $G_{za}$ by 1.0. The scaled $G_{xa}$, $G_{ya}$, and $G_{za}$ components are then added in step 131 to form $G_{tota}$ 132. The scaled $G_{xa}$, $G_{ya}$, and $G_{za}$ components are further scaled by predetermined constants $K_{gx\omega}$, $K_{gy\omega}$, and $K_{gz\omega}$, e.g. 0.2, 0.5, and 1.0, in steps 133, 134, and 135, respectively, to form $G_{x11}$, $G_{y11}$, and $G_{z11}$ which are then added in step 139 to form $G_{tot}$ 140.

The $G_{tot}$ value first passes through test step 141, which is used to select an appropriate bias function depending on the capability of the motion base system. Next, depending on the current motion base system configuration, $G_{tot}$ is scaled by one of two bias functions in one of full-G bias function step 146 or limited-G bias function step 148.

Figure 5A:
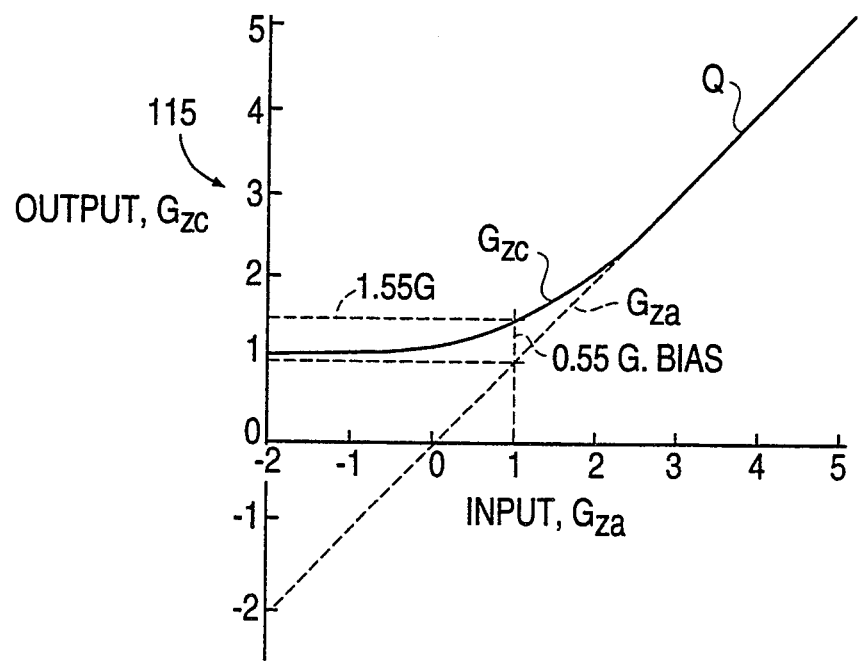
FIG. 5(a) is a graph of the total gravity by force $G_{zc}$ of a motion base system as a function of the total gravity force $G_{za}$ of a moving vehicle to be simulated.
Figure 5B:
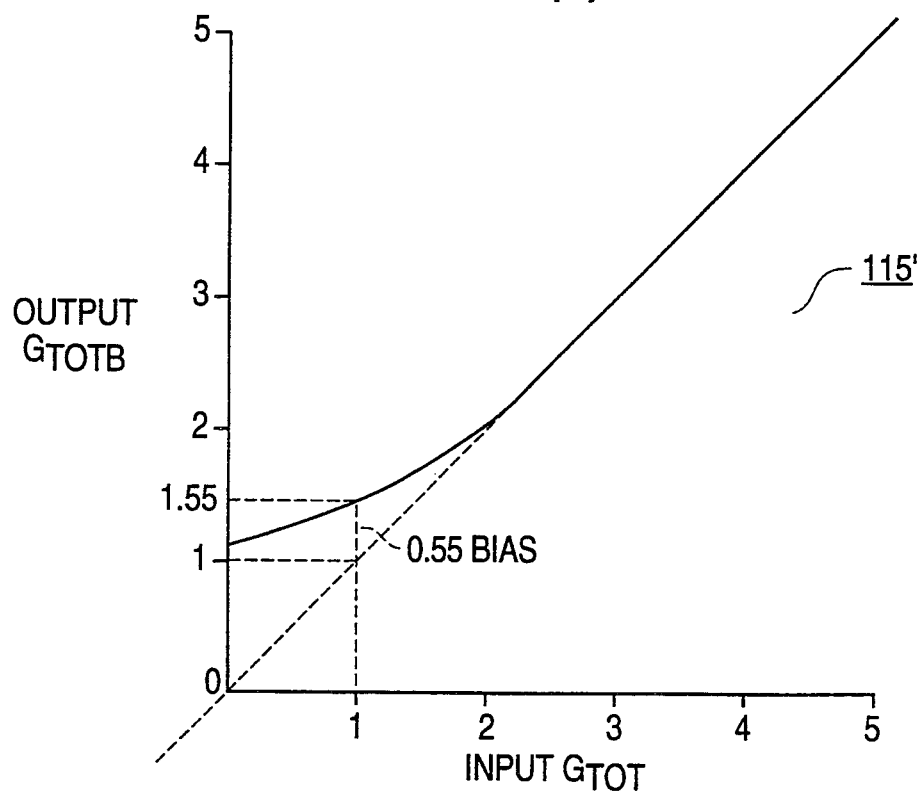
FIG. 5(b) is a graph of the total gravity force motion base system as a function of the total gravity force to be simulated.

A version of full-G bias function for $G_{za}$ only has been described in detail in the above incorporated U.S. Pat. No. 4,751,662 to Crosbie (FIG. 5(a)). The full-G bias function of the described embodiment is shown in FIG. 5(b). The described embodiment biases $G_{tot}$ (the total G force). Full-G bias function 146 is optimized for long arm, high-G devices (which can effect forces up to approximately 40 G). As shown in FIG. 5(b) the full-G bias function is preferably a polynomial function that biases the 1.0 G of earth's gravity to 1.55 G, for example, thereby allowing for the sensations of variations in $G_{tot}$ at or below the 1.0 G of earth's gravity, while matching the simulated vehicle $G_{tot}$ at and above 3.0 G. Alternately, full-G bias function 146 can be a multi-part function, implementing a different bias function for values of $G_{tot}$ at or below 2.0 G, between 2.0 G and 3.0 G, and at or above 3.0 G.

Limited-G bias function 148 is optimized for short arm, low-G devices. It is a function that also allows for the sensations of variations in $G_{tot}$ at or near the 1.0 G of the earth's gravity. However, limited-G bias function 148 gradually saturates as the vehicle $G_{tot}$ exceeds a $G_{tot}$ of which the motion base is capable. Thus, the limited-G bias function takes the limited G capability of the motion base configuration into account.

The form of the limited-G bias function 148 depends on an expected range of maneuvers to be simulated. When the motion base system is a short arm device capable of providing up to 2.0 G'S for example, and when the motion base will be simulating low-G maneuvers, i.e., when $G_{tot}$ will usually be between 1.0 and 1.5 G's, limited-G bias function 148 is preferably a spline function. Thus, the limited-G bias function will begin saturating as $G_{tot}$ exceeds 1.5 G's. Thus, the motion base operator will feel a largest amount of change in the G forces for $G_{tot}$ less than 1.5 G. In contrast, when the motion base system is a short arm device capable of providing up to 2.0 G's, for example, and when the motion base system will be simulating high-G maneuvers, i.e., when $G_{tot}$ regularly will be in the range 4.0 to 6.0 G's, limited-G bias function 148 is preferably a piecewise linear function. Thus, the most change to $G_{tot}$ will be felt in the range 4.0 to 6.0 G's. Furthermore, when the motion base system is not expected to simulate a G force higher than the capability of the motion base system, limited-G bias function 148 can be other types of functions, such as a parabolic function or an exponential function.

The selected bias function thus produces $G_{totB}$ 154, which describes the biased linear G force of the vehicle that the motion base system is to simulate. This biased linear G force is converted to an arm angular velocity V1 in step 152 according to the formula:

$$V1 = \sqrt[4]{(g^2/r^2)(G_{totB}^2 - 1)}$$

Next, in step 156, angular velocity V1 is added to angular velocity V2 of step 125, which is either the scaled yaw angular velocity $R_a$ or zero. Thus, step 156 yields an arm angular velocity $\omega$ that may or may not be modified to control yar, depending on whether the yaw angular velocity Ra is in a steady state, and the conditions of step 122 are met.

Lastly, arm angular velocity $\omega$ preferably passes through a filter step 160, which delays arm angular velocity $\omega$ by a time constant of $T_{c\omega l}$, for example, 0.1 seconds, to prevent undesirable "sharp" commands to the arm drive motor. Arm 12 may be, for example, 50 feet long and controlled by a large motor with a long onset time, a large overshoot value, and a long settling time. In contrast, some gimbal motors used in the motion base system according to the present invention are relatively quite small and require much less time to respond to control signals. Thus, arm angular velocity $\omega_c$ from step 160 is used to drive arm 12.

Figure 15A:
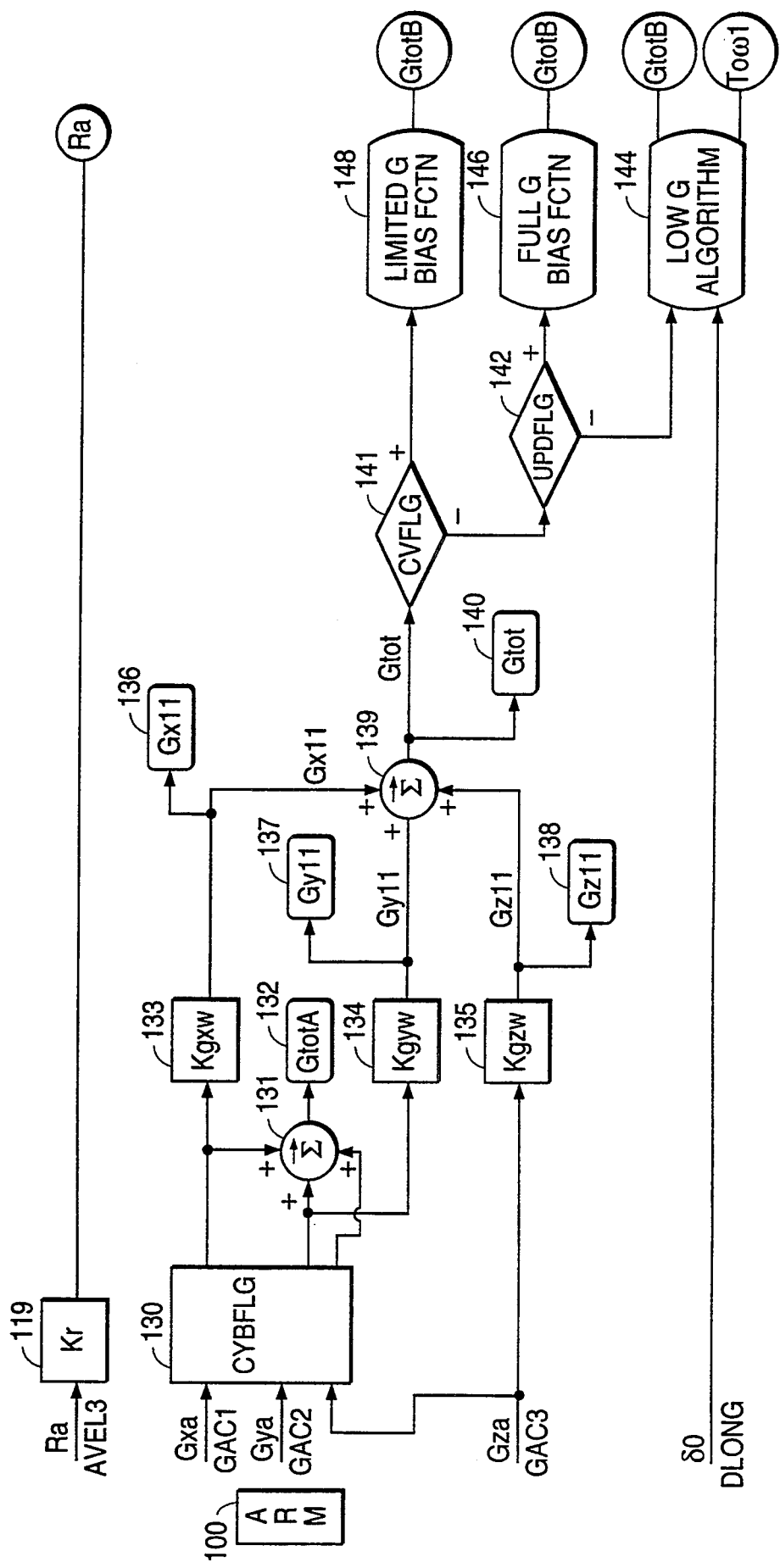
FIGS. 15(a) and 15(b) are flow diagrams of an arm control subprocess of a second preferred embodiment of the present invention.
Figure 15B:
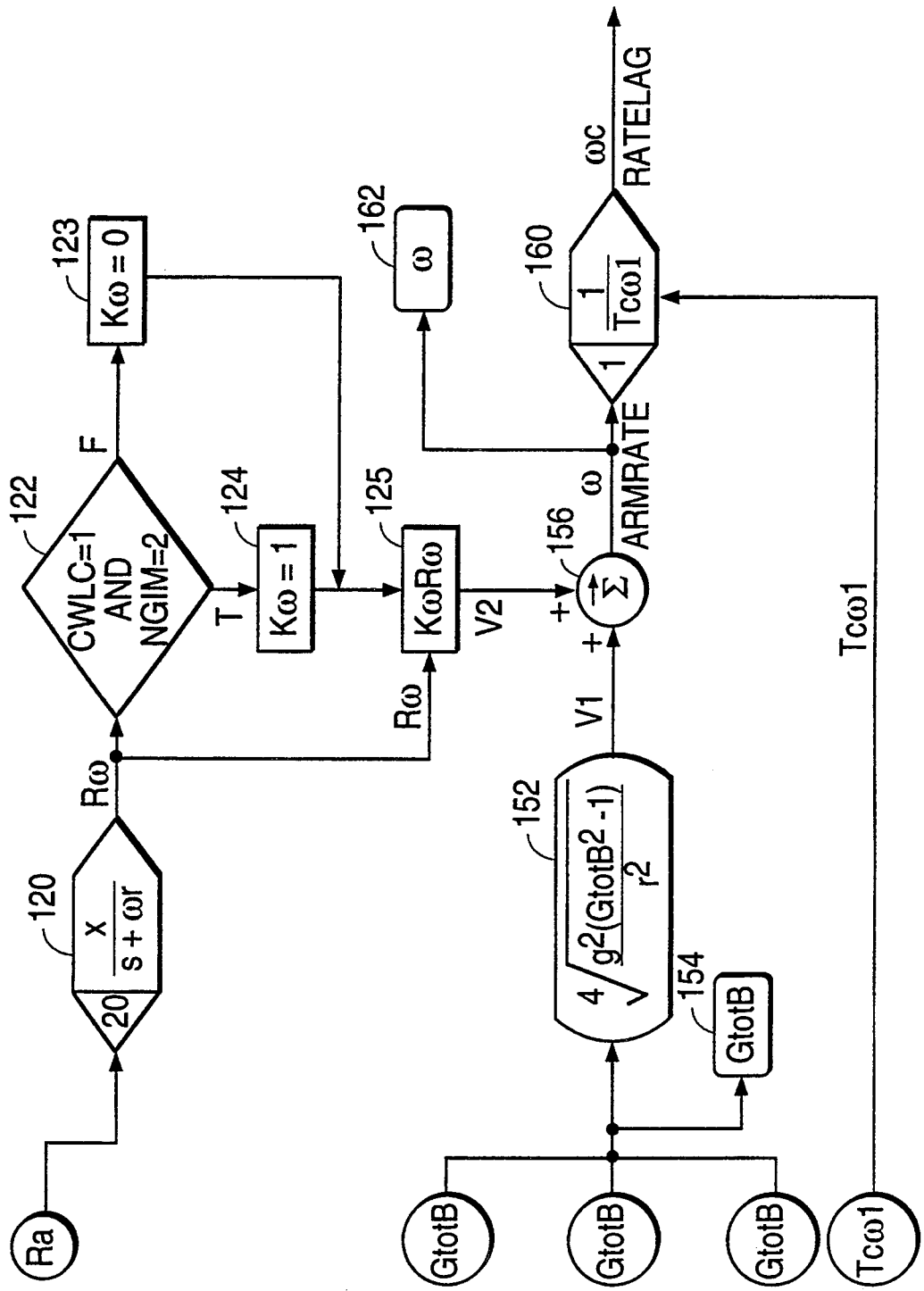
Figure 16A:
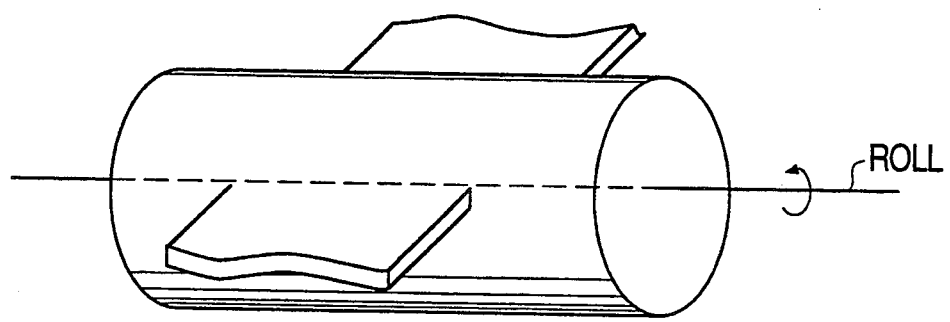
FIG. 16(a) is a diagram of a roll axis of an aircraft.
Figure 16B:
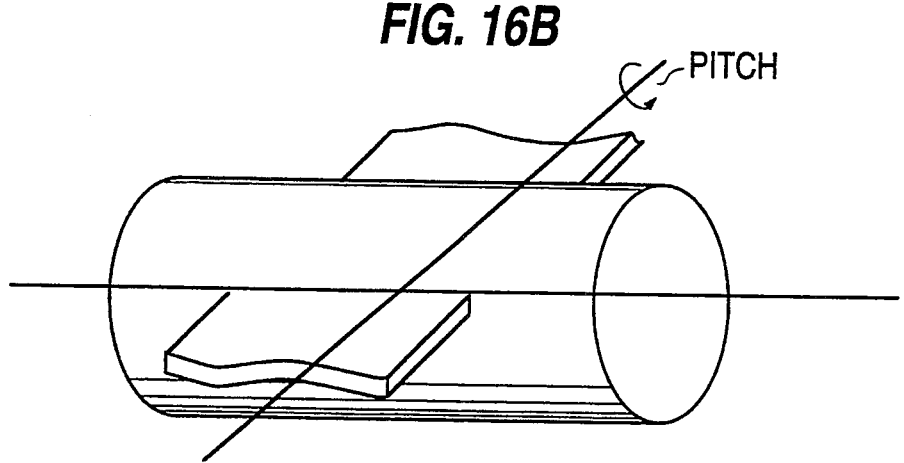
FIG. 16(b) is a diagram of a pitch axis of an aircraft.
Figure 16C:
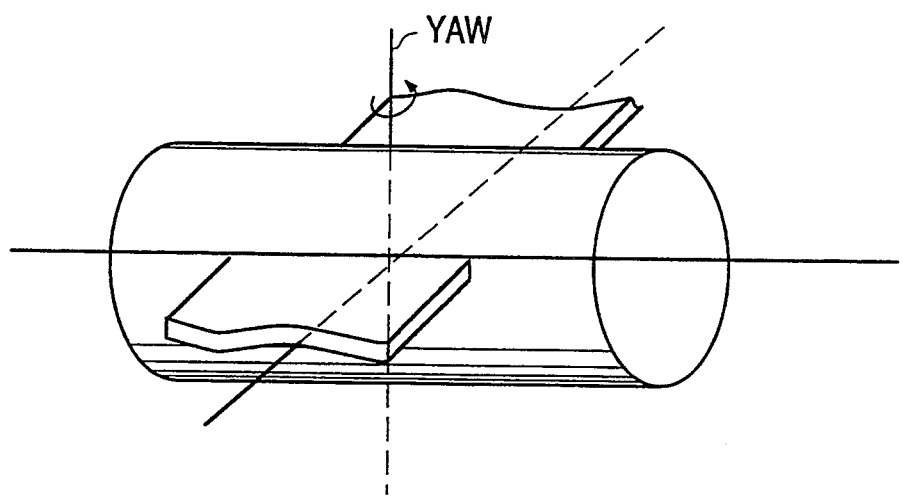
FIG. 16(c) is a diagram of a yaw axis of an aircraft.

In a second embodiment of the present invention, arm drive subprocess 100 contains a third bias function, as shown in FIG. 15. The third bias function is a multi-function routine that reduces long arm motion base artifacts for low G vehicle simulation while retaining high G fidelity. Step 142 sends $G_{tot}$ through a low-G bias function if the simulation is expected to operate in a low G environment, (i.e. $<3$ G). During a low-G phase of vehicle simulation on long arm devices, the changes in arm speed required for relatively small changes in simulated vehicle G create relatively large changes in arm speed and gimbal motion, which are disturbing to the operator controlling the motion base system. Thus, instead of changing the arm speed to position the force vector on the pilot, the arm speed is held constant and the operator is positioned, by the use of the gimbals, with respect to the vector. The process returns to matching the motion base $G_{totb}$ to the vehicle $G_{tota}$ at the upper G-limit (i.e. 3 G). During the transition from low G to high G, (greater than 3.0 G, for example) the process uses a predictive routine based on the longitudinal position of the operator's control stick to determine the optimum method for accelerating the arm.

The predictive routine takes into account a history of longitudinal stick position. Thus, if an operator has been making small stick corrections, the low G algorithm ignores these changes. However, if the process detects that the operator has initiated a sharp stick maneuver resulting in expected high G, the process begins matching the motion base.

Other factors used in the predictive process are vehicle dynamics related. Thus, the low-G process is vehicle specific and must be determined empirically for each vehicle.

C. The B and A Gimbal Drive Subprocesses

As shown in FIG. 11, B gimbal drive subprocess 200 comprises a pitch section 280 and an omega section 290. Similarly, A gimbal drive subprocess 300 comprises a roll section 380 and an omega section 390. Omega sections 290 and 390 create a base line position for the B and A gimbals from which desired pitch and roll perceptions can be effected. Pitch and roll sections 280 and 380 compute the gimbal motions required to create the desired sensations of pitch and roll, respectively. The outputs of pitch and roll sections 280 and 380 and omega sections 290 and 390 are combined in gimbal position computation step 254, which will be described in more detail below.

Omega section 290 includes a step 220, a step 224, a step 226, a step 240, a step 242, a step 244, a step 252, a step 254, and a step 256.

Similarly, omega section 390 includes a step 228, a step 230, a step 240, a step 242, a step 246, a step 252, a step 254, and a step 258.

Omega sections 290 and 390 of A and B gimbal drive subprocesses 200 and 300 are similar in design. One difference between the two omega sections is that omega section 290 of B gimbal drive subprocess 200 includes time delayed differentiator step 220, while omega section 390 of A gimbal drive subprocess 300 includes time delay step 228. However, both step 220 and step 228 use a filter constant of $T_{cw2}$, for example 0.5, so that the outputs of steps 220 and 228 are in phase.

Arm velocity $\omega$ from arm drive subprocess 100 is input to time delay differentiator step 220, which produces an arm angular acceleration $\hat{\omega}_{cl}$. The value $\hat{\omega}_{cl}$ is attenuated by a predetermined constant $K_B$, 0.7, for example, in step 224 to produce a scaled arm angular acceleration $\hat{\omega}_c$. Step 226 uses scaled arm angular acceleration $\hat{\omega}_c$ to produce an angular acceleration component $G_t$, which is a tangential G component caused by the angular acceleration of arm 12, by means of the equation:

$$G_t = r\hat{\omega}_c/g.$$

where r is a radius of arm 12 and g is the acceleration of gravity.

Similarly, $G_r$, which is a radial component caused by the angular velocity of arm 12, is computed in time delay step 228 and step 230, which converts a time delayed angular velocity $\hat{\omega}_c$ from step 228 to $G_r$ by means of the equation:

$$G_r = (r\cdot\hat{\omega}_c)/g.$$

Both $G_r$ and $G_t$ are input to C gimbal interaction step 240, along with a value $C_c$ indicating a commanded angular position of the C (yaw) gimbal (FIG. 12). C gimbal interaction step 240 modifies the functions of the A and B gimbals based on the commanded position of the C gimbal as shown in FIG. 12 and described below.

Figure 13:
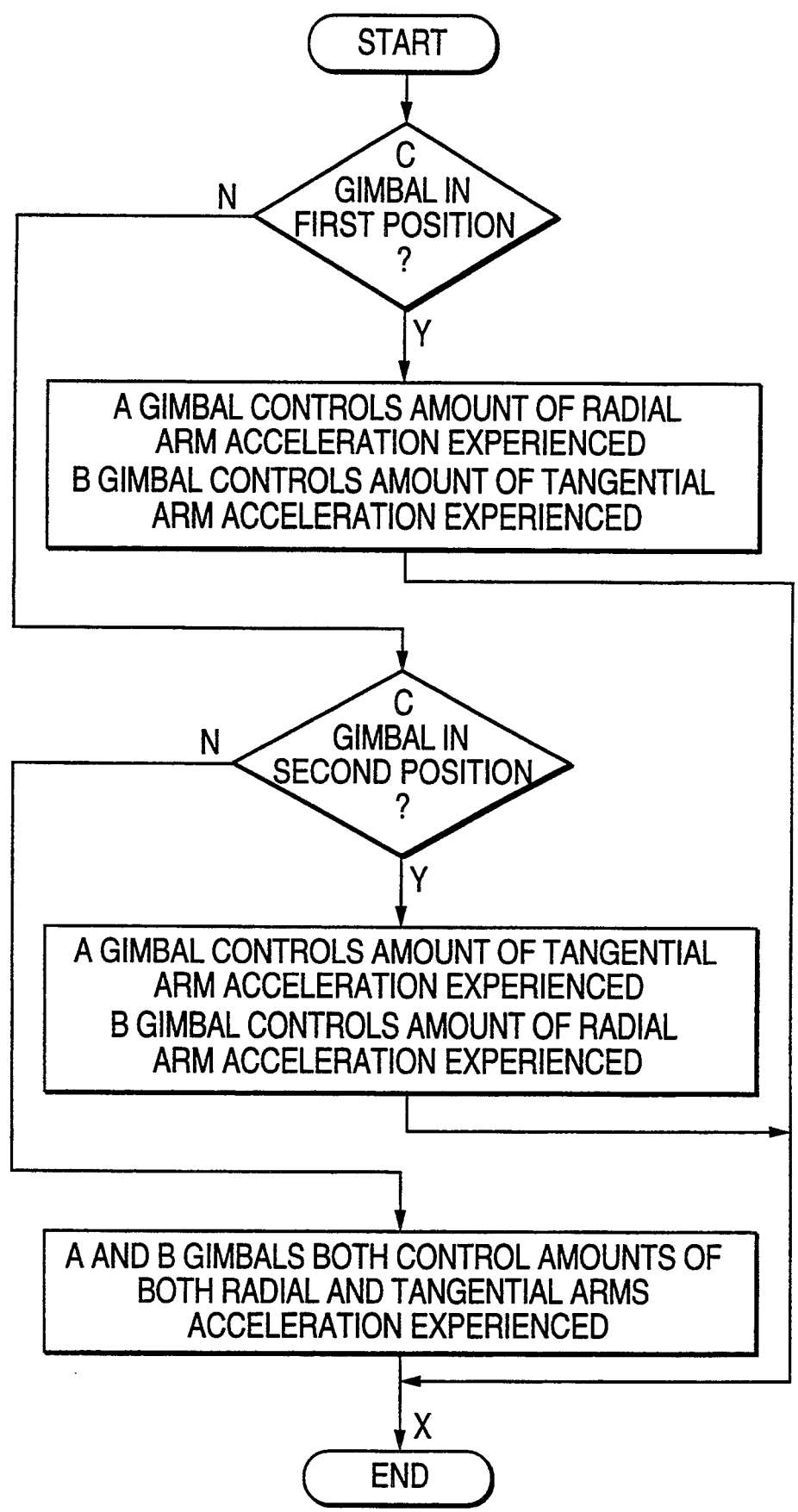
FIG. 13 is a flow diagram of a C gimbal interaction process of the A and B gimbal drive subprocesses of FIG. 11.

FIG. 13 illustrates the effects of the A and B gimbals when the C gimbal is at various predetermined positions. The actual computation of x and y involves Equations (13) and (14). If the C gimbal is at a first predetermined position, i.e., with the axis of the A gimbal perpendicular to arm 12 in the horizontal plane, the A gimbal will control the effect of the radial acceleration of arm 12 experienced by the motion base operator, and the B gimbal will control the effect of the tangential acceleration experienced by the motion base operator. Similarly, if the C gimbal is at a second predetermined position, i.e., with the axis of the A gimbal parallel to arm 12 in the vertical plane, the A gimbal will control the effect of the tangential acceleration and the B gimbal will control the effect of the radial acceleration. Similarly, when the C gimbal is at some position other than the first or second predetermined positions, the A and B gimbals will each control the effect of some portion of the radial and the tangential acceleration.

Step 240 is performed only for three gimbal systems. Step 240 is a "pass-through" step for two gimbal systems. C gimbal interaction step 240 outputs an X value and a Y value, signifying what portion of the radial and/or tangential vectors are controlled by the A and B gimbals, respectively in accordance with equations 13 and 14. The X and Y values are then input to a negative-G process step 242. Step 240 also outputs a value $\psi$ 241 which represents an angular velocity of the C gimbal.

Negative-G process step 242 allows the motion base system to simulate maneuvers in which $G_{za}$ may be both positive and negative. This preferably is accomplished by tilting the cockpit to outboard more than ninety degrees, in a direction such as shown in FIGS. 6(b), 8(b), and 9(b). The outboard tilt places an operator so that his head is tilted away from the center of the circle described by arm 12 and, if he is facing in the direction of motion, gives the operator the perception that he is experiencing a negative G force. During normal operation of the described embodiment, the cockpit will not be tilted more than ±90 degrees inboard and outboard. The negative G process may tilt the cockpit more than 90 degrees.

Negative-G process step 242 has as inputs scaled $G_{x1}$, $G_{yl}$, and $G_{zl}$ from A and B gimbal drive subprocesses 280 and 380, and X and Y values which are outputs of the C gimbal interaction 240. Also included are the initial pitch and roll switch inputs from the operator, $\delta e$ and $\delta a$, respectively. These inputs are used to compute a total $G_{(TOT)}$ value to be simulated by the motion base system.

Switches $\delta a$ and $\delta e$ (not shown) are three-way switches that are preferably located inside the cockpit in a location accessible to the operator. Prior to initiation of an operation expected to generate negative G forces in a roll maneuver, such as a roll right con, hand for an aircraft, the operator moves the $\delta a$ switch from its normal position to a "plus" position. This movement sets a constant $k_{yl}$ to +1.0 and the constant is used by the negative G process as described below. Prior to initiation of an operation expected to generate negative G forces in a pitch maneuver, the operator moves the $\delta e$ switch from its normal position to a "plus" position. This movement sets a constant $k_{x1}$ to +1.0 and the constant is used by the negative G process as described below.

Negative-G process step 242 produces four outputs: X and Y, of Equations 13 and 14, which, as discussed below in connection with steps 244 and 246, are used to calculate the coordinated components of the B and A gimbal angles, respectively, and $G_{xln}$ and $G_{yln}$ which are, respectively, the $G_x$ component controlled by the B gimbal motion and the $G_y$ component controlled by the A gimbal motion. $G_{xln}$ and $G_{yln}$ are input to steps 212 and 312 described later. It will be understood that, if a negative G force is not required, step 242 simply passes its input values through unchanged.

Note that, because the $G_x$, $G_y$, and $G_z$ components have been scaled, the total G value to be simulated is actually compared to the total G of the motion base as defined by the radial, tangential, and vertical accelerations of arm 12:

$$\text{Total } G_c = \sqrt{G_t^2 + G_r^2 + 1}$$

Thus, the total G to be simulated by the motion base may actually be greater than 1.0 and still represent a negative G force in the simulated vehicle.

Simulation of negative G is not simply a matter of positioning the motion base system operator into a negative $G_z$ condition, but one of providing a control process which would enable the operator to maneuver in and out of that condition in the middle of a realistic motion scenario. That is, the control process which enables the operator to control the motion base system and perceive realistic motion cues must be extended to include the negative G realm.

The following example discusses negative G for an aircraft. The discussion may also apply to other types of simulated vehicles. Aerodynamically, for example, a negative $G_{za}$ maneuver is generated when the pilot initiates a pitch or a roll command to the aircraft. As a result, the pilot's acceleration is reduced from positive $G_{za}$ (above 1.0 G), through zero G (1.0 G), to negative $G_{za}$ (below 1.0 G) without the operator being exposed to a $G_x$ or $G_y$ acceleration. Since ground based facilities cannot accurately simulate the total G force environment in the region of $[-1.0, +1.0]$ G, the result is a compromise. This compromise must be made, however, in such a manner as to provide a sense of realistic motion to the motion base system pilot. Thus, if a roll right will result in a negative $G_z$ condition, the pilot must sense a right roll prior to entering the negative G condition.

In order to simulate a negative $G_{za}$ maneuver in a ground based motion system, the aircraft $G_{za}$ and angular rate (Pa or Qa) that accompanies the maneuver will be used to move the gimbals to provide the negative G sensation. However, since the G-environment of all ground based systems is bounded by the one G of the Earth's gravity plus a possible biased G, an unrealistic Gy or Gx caused by the $G_{za}$, and Pa or Qa command, unfortunately are developed during the transition from positive to negative $G_z$.

Because this negative G mode of operation introduces some degree of unrealistic perceptions or the operator during the transition from positive to negative $G_{za}$, which would occur every time $G_{za}$ dips even slightly below 1 G, it is usually desirable to prevent the negative G mode from being active unless the operator desires to experience the effect of negative $G_{za}$. These unrealistic perceptions are generated by the second terms in the equations for $G_{xln}$ and $G_{yln}$ in below. For example, an operator may not want to experience negative G if the operator is performing small stick maneuvers around 1 G. In such a case, it may be desirable for the negative G process to ignore the fact that $G_{za}$ has dropped below "1." In contrast, if an operator moves the controls to indicate a complete roll, the operator should perceive negative G.

The switches $\delta a$ and $\delta e$ allow the operator to indicate his expectations regarding negative G. It is critical that the operator press the negative G switch before initiation of a negative G maneuver. Otherwise, the operator will not experience a smooth transition to negative G.

Alternately, the negative G process could employ a predictive process, similar to that described above in connection with FIG. 15, where small corrective stick movements are ignored.

Thus if the negative $G_{za}$ command is initiated with a roll right, the roll control of the aircraft $\delta_a$ will develop the roll sensation for the motion base system operator through the motion of the A gimbal. This will also develop an unrealistic $G_y$ for the motion base system operator. This $G_y$ results from the pilot being rolled through the $G_{totb}$ of the motion base and is in addition to the $G_{yl}$ of the simulated aircraft. The equation for the resultant $G_{yln}$, which will be used to derive the $A_2$ component of the A gimbal drive, is:

$$G_{yln} = G_{yl} + K_{yl}\sqrt{Y^2 + G_y^2 - \frac{(G_{zl} + X \cdot \sin(B))^2}{\cos^2(B)}}$$

where
B = angle of B gimbal deflection
when $\delta_a = 0$, $K_{yl} = 0$,
when $\delta_a = 1$, $K_{yl} = +1$,
when $\delta_a = -1$, $K_{yl} = -1$,
$G_v$ = one G due to gravity.

Similarly, if the initial motion is a roll left, then the above equations are true for both cases with the only difference being the "+" sign before $K_{yl}$ becomes a "−" sign for the negative $G_{za}$ case.

Likewise, if the negative $G_{za}$ command is initiated with a pitch up, the pitch control of the aircraft $\delta_e$ will develop the pitch sensation for the motion base system pilot through the motion of the B gimbal. This will also develop an unrealistic Gx for the motion base system pilot. This Gx results from the pilot being pitched through the $G_{totb}$ of the motion base and is in addition to the $G_{x1}$ of the simulated aircraft. The equation for resultant $G_{xln}$, which will be used to derive the $B_2$ component of the B gimbal is:

For positive $G_{za}$ flight, $G_{xln} = G_{xl}$
For negative $G_{za}$ flight, $$G_{xln} = G_{xl} + K_{xl}\sqrt{X^2 + (Y \cdot \sin(A_a) + G_v \cos(A))^2 - G_{zln}^2}$$

where $A_a$ = angle of A gimbal deflection
when $\delta_e = 0$, $K_{xl} = 0$
when $\delta_e = 1$, $K_{xl} = +1$,
when $\delta_e - 1$, $K_{xl} = -1$.

Similarly, if the initial motion is a pitch down then the above equations are true for both cases with the only difference being the "+" sign becomes a −sign before $K_{xl}$ for the negative $G_{za}$ case.

Finally, it is required that the control process of the present invention be able to smoothly control the transition back to positive $G_{za}$ flight. This method will depend on the mechanical design of the motion base system itself. If the motion base has the capability of continuous 360 degrees rotation in the pitch and roll axes, the return to positive $G_{za}$ can be attained by continuing to roll or pitch in the same direction. If either or both axes are limited, then the direction of gimbal motion must be retraced. This does not preclude, however, returning to positive $G_{za}$ flight using the other gimbal (i.e., using the pitch gimbal if the initial motion were roll).

Negative-G process step 242, which is a pass-through step if there are no negative G requirements, outputs X and Y values representing the effects of radial and tangential forces controlled by the B and A gimbals. Steps 244 and 246, respectively, convert X and Y into angles of rotation for the B and A gimbals, respectively, to align the operator with the resultant of the radial, vertical, and tangential accelerations.

The A and B angles from steps 244 and 246 are input to an optimization routine step 252, which creates a gimbal response to the input angles in such a way that the vector and angular components of the gimbal motion cancel each other during the transient, as well as the steady state, thereby generating angles $B_l$ and $A_l$ that totally negate the motion base artifacts. Angles $B_l$, and $A_l$, are input to gimbal position computation step 254 to be described later.

Figure 17:
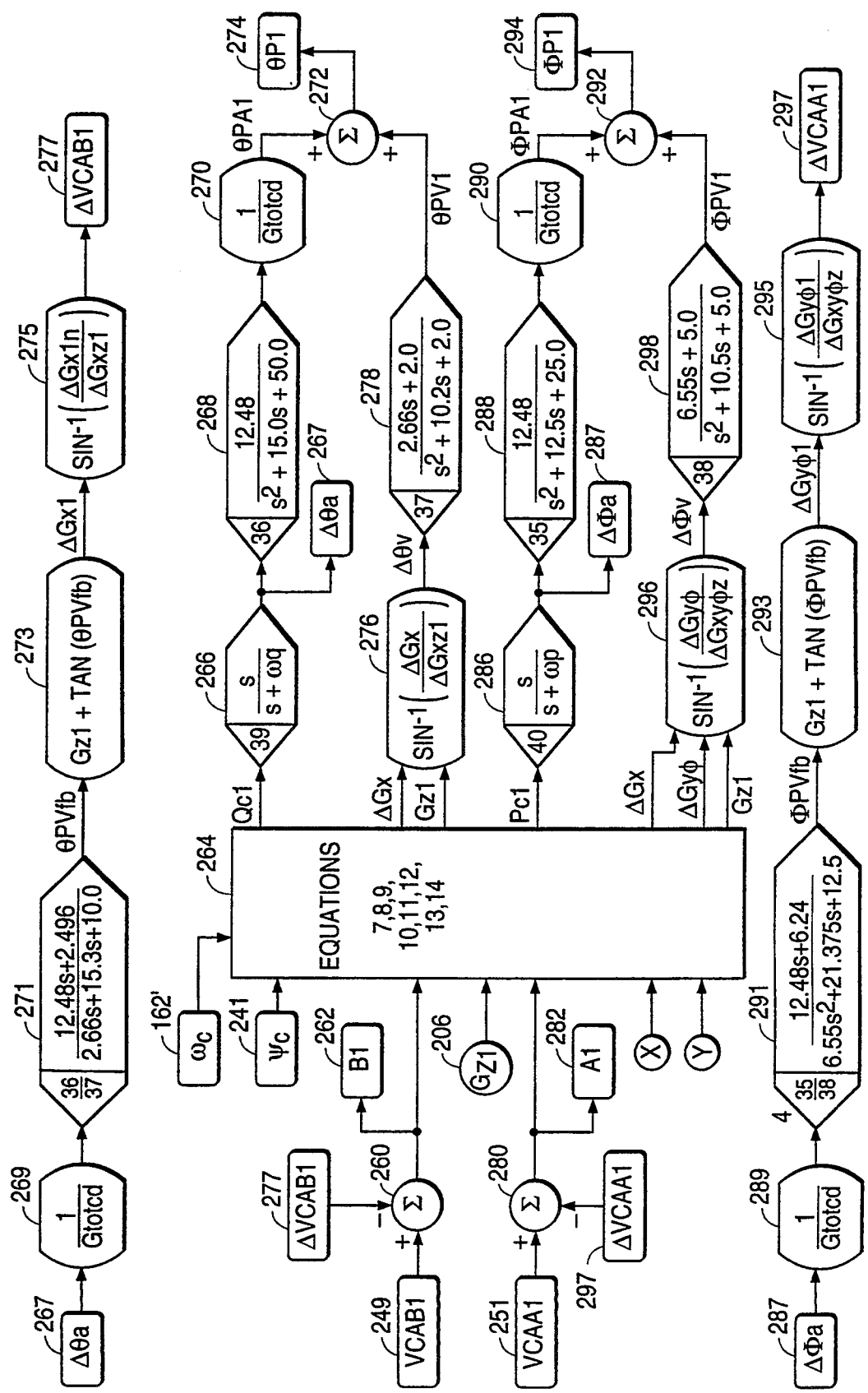
FIG. 17 is a flow diagram of an optimization routine of FIG. 11.

FIG. 17 is a flow diagram showing the operation of the internal optimization routine 252 of FIG. 11(b). Signal AVCAB1 277 (described below) is subtracted from first B gimbal drive signal VCAB1 249 in step 260 to produce a value B1 262. Signal AVCAA1 297 (described below) is subtracted from first A gimbal drive signal VCAA1 251 in step 280 to produce a value A1.

B1, A1, $\omega_c$, $\psi_c$, X, Y, and $G_{z1}$ are combined in step 264 to produce $Q_{c1}$, $P_{c1}$, $\Delta G_x$, $\Delta g_{y\phi}$, and $G_{z1}$ in accordance with Equations 7-11. When applying Equations 7-11, the value of B1 is substituted for $\theta_c$ and the value of A1 is substituted for $\phi_c$. $Q_{cl}$ is filtered by a washout filter in step 266 to produce $\Delta\phi_a$. $\Delta\phi_a$ is attenuated in step 269 and filtered in step 271 by an inverted transfer function to produce the vector feedback angle $\theta$PVfb. $\theta$PVfb is converted in step 273 to $\Delta G_{xl}$ which is combined with $G_{z1}$ in step 275 to produce AVCAB1.

The resultant B1 signal produces a $\Delta G_x$ in step 264 (Equation 7) which is combined with $G_{z1}$ in step 276 to produce the vector angle $\Delta\theta_y$. $\Delta\theta_y$ is filtered in step 278 to produce $\theta$Pvl which is summed in step 272 to produce $\theta$P1. The above internal optimization process minimizes $\theta$P1, i.e., the resultant perceived pitch motion generated by B1 itself or by B1 in combination with the motion of the arm and other gimbals. Note, however, that $\Delta\theta a$ is input to step 267. Step 271 is an inversion of steps 268 and 278.

$P_{c1}$ is filtered by a washout filter in step 286 to produce $\Delta\phi_a$. $\Delta\phi_a$ is attenuated in step 289 and filtered in step 291 by an inverted transfer function to produce the vector feedback angle $\phi$PVfb.

$\phi$PVfb is converted in step 293 to $\Delta G_{y\phi 1}$ which is combined with $G_{z1}$ and $\Delta G_x$ in step 295 to produce AVCAA1.

The resultant A1 signal produces a $\Delta G_{y\phi}$ in step 264 which is combined with $G_{z1}$ and $\Delta G_x$ in step 296 to produce the vector angle $\Delta\phi_y$.

$\Delta\phi_y$ is filtered in step 292 to produce $\phi_{p1}$.

The above internal optimization process minimizes $\phi_{p1}$, the resultant perceived roll motion generated by A1 itself or by A1 in combination with the motion of the arm and other gimbals. Note, however, that $\Delta\phi a$ is input to step 287. Step 291 is an inversion of steps 288 and 298.

Pitch section 280 of B gimbal drive subprocess 200 has three inputs: a pitch rate (an angular velocity) $Q_a$ of the simulated vehicle, a scaled $G_{zll}$ linear acceleration from arm drive subprocess 100, and a scaled linear acceleration $G_{xll}$ of the simulated vehicle. Step 201 scales pitch rate $Q_a$ by a predetermined constant $K_Q$, for example, 0.7. Step 202 filters the scaled $Q_a$ and produces an angle $B_3$ creating an operator perception of the pitch rate $Q_a$. Step 204 filters linear acceleration $G_{xl}$ by a predetermined filter value $\tau$Bxl, for example, 0.2, producing a $G_{xl}$ which is then passed through step 242 to produce $G_{xll}$. The scaled $G_{zll}$ is filtered in step 203 to produce $G_{zl}$. The $G_{xln}$ value and the scaled and filtered $G_{zl}$ value are input to a step 208, which computes a vector $G_{xzln}$ in the XZ plane. Step 212 converts the vectors $G_{xzln}$ and $G_{xln}$ to an angle $B_2$ which is then passed through step 254 creating an angle which is the operator's perception of the $G_{xln}$ component.

$$B_2 = \sin^{-1}\left[\frac{(G_{xln})}{(G_{xzln})}\right] = \cos^{-1}\left[\frac{(G_{zl})}{(G_{xzln})}\right]$$

where $G_{xzln} = \sqrt{G_{xln}^2 + G_{zl}^2}$

Step 214 converts $B_2$ to $(\pi - B_2)$ when $B_2$ reaches $\pm\pi/2$ and there is a requirement for negative $G_z$ involving the B gimbal.

Roll section 380 of A gimbal drive subprocess 300 has four inputs: a roll rate (an angular velocity) $P_a$ of the simulated aircraft, the scaled, $G_{yll}$, linear acceleration from arm drive subprocess 100, and the scaled and filtered $G_{xl}$ and $G_{zl}$ from subprocess 280. Step 301 scales roll rate $P_a$ by a predetermined constant $K_p$, for example, 0.7. Step 302 filters the scaled $P_a$ and produces an angle $A_3$ creating a pilot perception of the roll rate $P_a$. $G_{yll}$ is passed through step 304 which filters with a predetermined value of $\tau$AY1 to produce $G_{yl}$.

$G_{yl}$ is passed through step 242 to produce $G_{yln}$ which is then added vectorially to $G_{xl}$ and $G_{zl}$ to produce $G_{xyzln}$. $G_{xyzln}$ is combined with (Y) in step 306 to produce $GT_{tl}$. Step 312 converts the vectors $G_{yln}$ and $GT_{tl}$ to an angle $A_2$ which is then passed through step 314 creating an angle which is the operator's perception of the $G_{yln}$ component:

$$A_2 = \sin^{-1}\left[\frac{(G_{ylN})}{G_{(Ttl)}}\right] = \cos^{-1}\left[\frac{(G_{zl})}{(G_{Ttl})}\right]$$

where $$GT_{tl} = \sqrt{G_{xyzln}^2 - Y^2}$$

Step 314 converts $A_2$ to $(\pi - A_2)$ when $A_2$ reaches $\pm\pi/2$ and there is a requirement for negative $G_z$ involving the A gimbal.

Gimbal position computation step 254 adds the separately computed angles $A_1$, $A_2$, and $A_3$ to obtain a final A gimbal motion GIMB1. Similarly, gimbal position computation step 254 adds the separately computed angles $B_1$, $B_2$, and $B_3$ to obtain a final B gimbal motion GIMB2. In a two gimbal system, where adjustments were made in step 130 of FIG. 10, computation of GIMB1 and GIMB2 depend on the orientation of the cockpit, as determined from input CKP 211. For example, if the cockpit is in an upright facing tangential orientation, GIMB1 and GIMB2 are computed by the following equations:

$$GIMB2 = B_1 + B_2 + B_3.$$

$$GIMB1 = A_1 + A_2 + A_3.$$

However, if, for example, the cockpit is oriented upright facing outward as in FIG. 9, GIMB1 and GIMB2 are computed by the following equations:

$$GIMB2 = B_1 - A_2 - A_3.$$

$$GIMB1 = A_1 - B_2 - B_3.$$

Other equations for GIMB2 and GIMB1 will be obvious from the above examples.

Lastly, the limits and lag of angles GIMB1 and GIMB2 are checked, respectively in steps 256 and 258 to ensure that they do not exceed either a "soft" limit in the motion base software or a "hard" limit, such as a physical stop on the gimbal mechanism. Angles GIMB1 and GIMB2 are also adjusted in steps 256 and 258 to account for differences between the response characteristics of the gimbals and arm drive motors. For example, a typical vertifuge device has a response lag of 50 μs for its arm drive motor and a typical centrifuge has a response lag of 200 μs for its arm drive motor. The response lag for the gimbal drive motors is typically much shorter than that of the arm drive motor.

D. The C Gimbal Drive Subprocess

As shown in FIG. 12, C gimbal drive subprocess 400 includes a step 401, a step 402, a step 404, a step 405, a step 407, a step 408, a step 409, a step 410, a step 411, a step 420, a step 422, a step 424, a step 426, a step 428, and a step 430. C gimbal drive subprocess 400 serves a dual purpose. A first, and more common, purpose of the C gimbal drive subprocess 400 is to expedite the orientation of the pitch and roll gimbals (normally the B and A gimbals, respectively) to efficiently position them with respect to the total G of the simulated vehicle. In this case, values for the constants $K_{cx}$ and $K_{cy}$ are selected (i.e. 0.4 and 0.0) based on whether $G_{xl}$ or $G_{yl}$ is to be diverted to control by the C gimbal and what portion, and constant $K_R$ is 0. Values for the constants $K_{cxB}$ and $K_{cyA}$ are selected (e.g., −0.2 and 0.0) based on where the C gimbal excursion is to take place. A second purpose is to impart yaw motion sensations to the pilot. In this case, constants $K_{cx}$ and $K_{cy}$ are 0 and constant $K_R$ is 1.0. The second purpose is most effective when both the pitch and roll gimbals place the operator in a substantially upright position.

C gimbal drive subprocess 400 has five vector inputs: $G_{xl}$ from B gimbal drive subprocess 200, $G_{yl}$ from A gimbal drive subprocess 300, and $G_r$ and $G_t$ derived from B and A gimbal subprocesses. C gimbal drive subprocess 400 also receives yaw rate (angular yaw velocity) $R_a$ and cockpit orientation indicator CKP 211. $G_{xl}$ is passed through step 402 to produce $G_{xc}$ and $G_{yl}$ is passed through step 407 to produce $G_{yc}$. $G_r$ and $G_t$ combine in step 401 to produce $G_{rt}$ which is then passed through step 405. The function of step 405 is to specify whether $G_{xl}$ or $G_{yl}$ or neither are used to control the C gimbal and the choice is preselected, according to experimentally derived values for the simulated vehicle. If $G_{xl}$ is selected, $G_{xc}$ and $G_{rt}$ are combined in step 404 to produce the angle $C_2$. If $G_{yl}$ is selected $G_{yc}$ and $G_{rt}$ are combined in step 409 to produce the angle $C_2$. If neither are selected, $C_2 = 0$. In step 410, yaw rate $R_a$ is scaled by the predetermined constant $K_r$ and input to a washout filter step 411, which outputs a zero value when its input is in a steady state. Thus, step 420 will either produce an output of $C_2$ or $C_3$ derived from the scaled yaw rate $R_a$, depending on which of the inputs to step 420 is zero. In some embodiments, step 420 also receives an input indicating an initial position of the C gimbal (CPOS) 424. If, in step 422, the motion base system is determined to have three gimbals, then an angle GIMB3 to control the C gimbal for one of the two purposes mentioned above is output. Limits and lag steps 426, 428, and 430, similar to steps 256 and 258 of A and B gimbal drive subprocesses 200 and 300 described above, adjust angle GIMB3 according to the limits of the motion base system and the difference between the response characteristics of the C gimbal and arm drive motors.

E. The Pilot Perceptual Simulator

Figure 7:
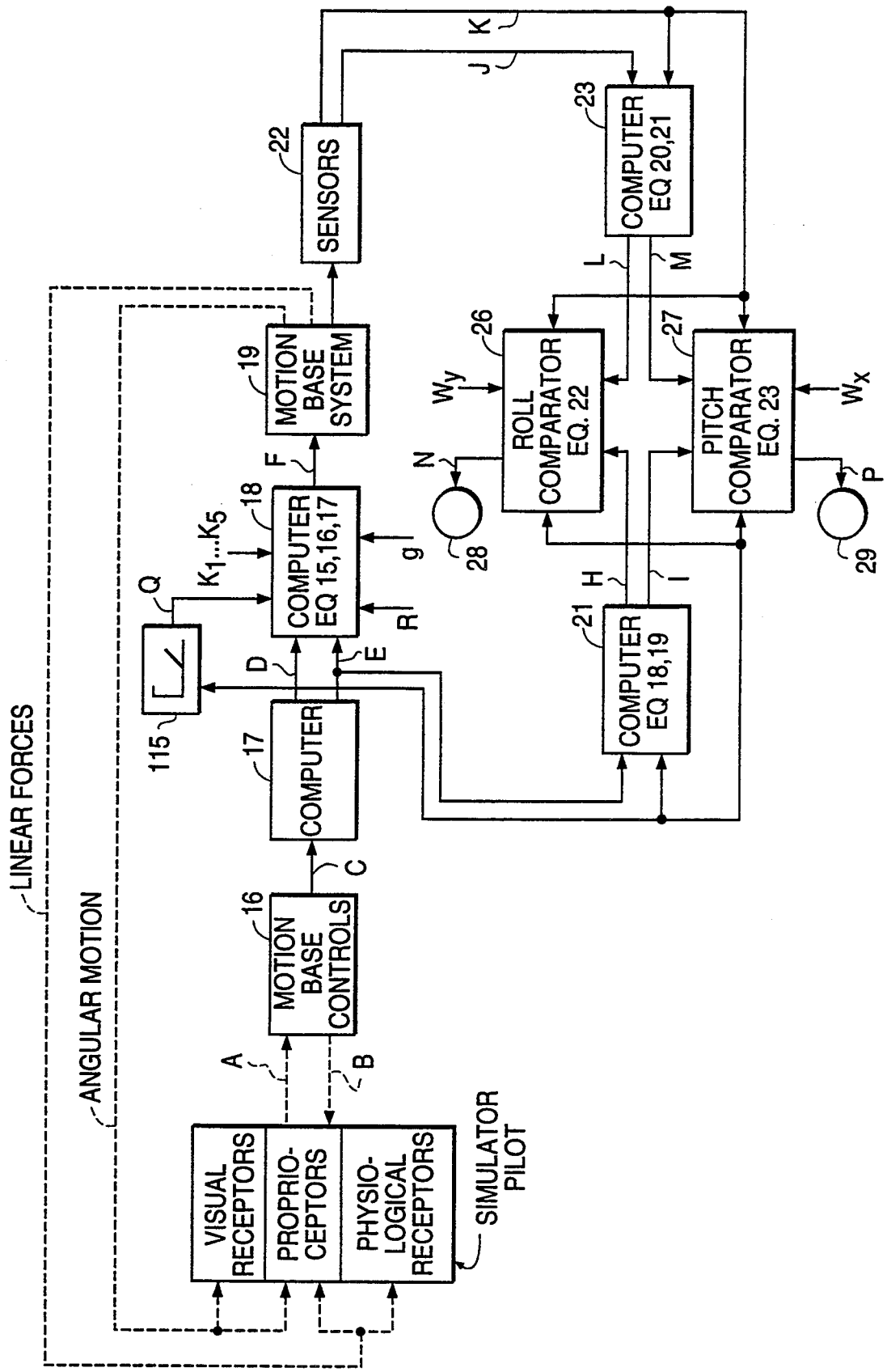
FIG. 7 is a block diagram of a motion base control system.
Figure 14:
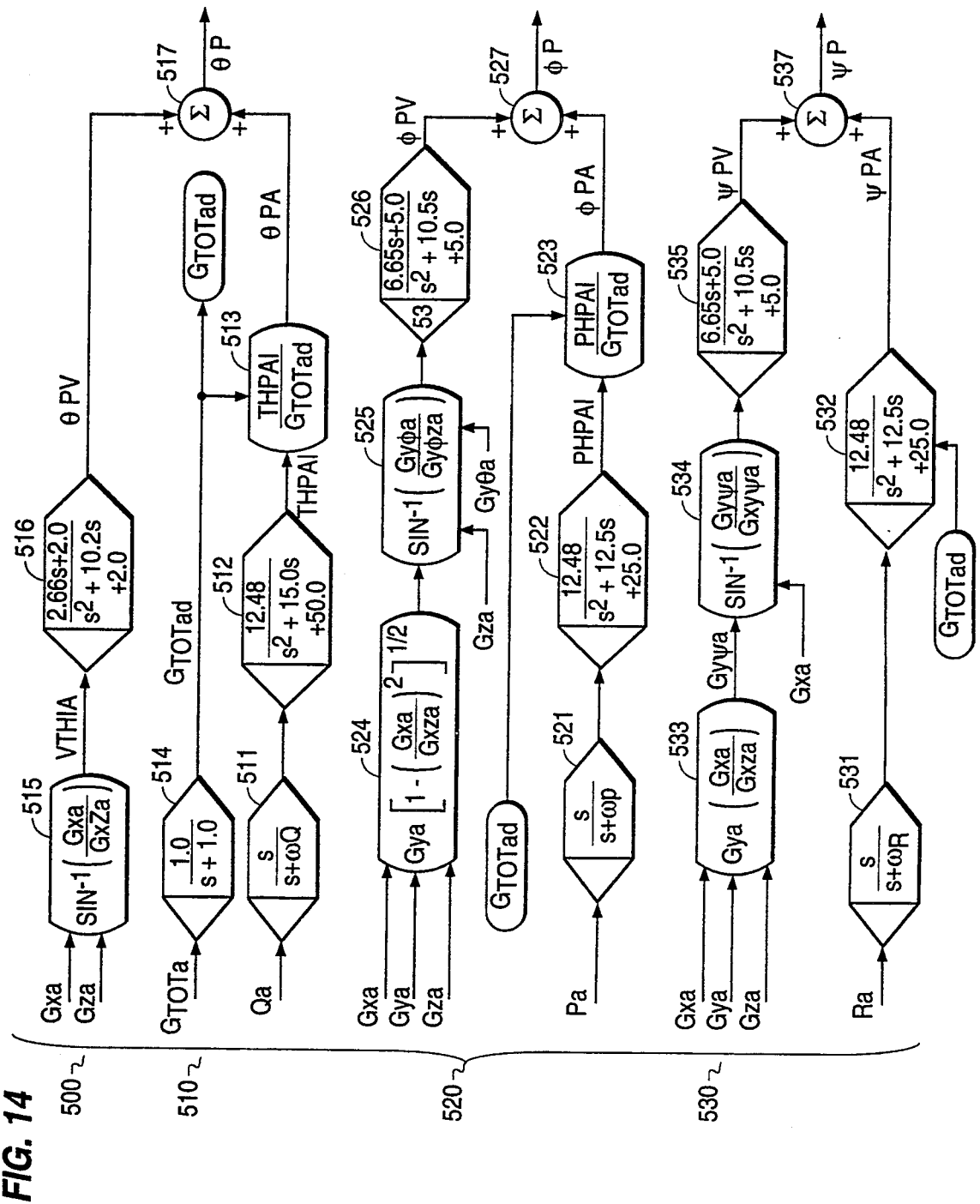
FIG. 14 is a flow diagram of a pilot perceptual model according to a preferred embodiment of the present invention.

FIG. 14 shows a flow chart for a pilot perceptual model 500, which can be implemented in a system similar to that of elements 21–29 of FIG. 7. Pilot perceptual model 500 predicts what angular motions an operator would sense when making a particular maneuver in either a moving vehicle or a motion base system. Pilot perceptual model 500 also facilitates the optimization of the arm drive and gimbal drive subprocesses of the motion base system and allows the motion base system to be fine-tuned to fit the preferences of an individual operator. Pilot perceptual model 500 is empirically based on the response of human proprioceptive systems to motion stimuli. Pilot perceptual model 500 includes three sections for pitch, roll, and yaw predictions, 510, 520, and 530, respectively. Each section has two parts, one for computing an angular component and one for computing a rotating vector component of a perceived angular motion. Note that, because of the nature of human proprioceptors, an angular motion perceived by an operator does not necessarily match the angular motion of the vehicle or motion base system. Thus, pilot perceptual model 500 is designed to predict substantially identical pitch, roll, and yaw perceptions for differing angular movements of the vehicle and motion base system.

Pilot perceptual model 500 receives six inputs: $G_{xa}$, $G_{ya}$, and $G_{za}$ components of the actual vector motion of the vehicle or motion base system, and a roll rate (angular velocity) $P_a$, a pitch rate (angular velocity) $Q_a$, and a yaw rate (angular velocity) $R_a$ of the actual angular motion aircraft or motion base system.

Pitch prediction section 510 receives four inputs: $G_{xa}$, $G_{za}$, $G_{TOTad}$ and $Q_a$. Washout filter step 511 outputs a function of Q, or, if Q has been in a steady state for substantially 3.0 seconds, "0." The value from step 511 is transformed by an empirically derived second order transfer function in step 512 to produce an angular component THPA1 of the perceived pitch. Step 515 computes an angle between $G_x$ and the vector formed by the vector sum of $G_x$ and $G_z$ to produce angle VTH1A, which is transformed by an empirically derived transfer function in step 516. Filter step 514 delays $G_{tota}$ to produce $G_{totad}$. Step 513 then computes a rotating vector component of the perceived pitch. Step 517 sums the angular and vector components from steps 513 and 516 and outputs a pitch perception $\theta p$.

Roll prediction section 520 receives five inputs: $G_{xa}$, $G_{ya}$, $G_{za}$, $G_{totad}$ from pitch prediction section 510, and roll rate $P_a$. Washout filter step 521 outputs a function of $P_a$, or, if $P_a$ has been in a steady state for substantially 3.0 seconds, "0." The value from step 521 is transformed by an empirically derived second order transfer function in step 522 to produce an angular component of the perceived roll. Step 524 computes a component of $G_y$ pertaining to roll motion and step 525 computes an angle between the roll component of $G_y$ the vector formed by the vector sum of the roll component of $G_y$ and $G_z$. Step 526 transforms the resultant vector rotation by an empirically derived second order transform function. Step 523 then computes an angular component of the perceived roll. Step 527 sums the angular and rotating vector components from steps 523 and 526 and outputs a roll perception $\phi P$.

Yaw prediction section 530 receives four inputs: $G_{xa}$ $G_{ya}$ $G_{za}$ and $R_a$. Washout filter step 531 outputs a function of $R_a$, or, if $R_a$ has been in a steady state for substantially 3.0 seconds, "0." The value from step 531 is transformed by an empirically derived second order transfer function in step 532 to produce an angular component of the perceived yaw. Step 533 computes a component of $G_{ya}$ pertaining to yaw motion and step 534 computes an angle between the yaw component of $G_{ya}$ and the vector formed by the yaw component of $G_{ya}$ and $G_{xa}$. Step 535 transforms the resultant vector rotation by an empirically derived second order transform function. Step 537 sums the angular and rotating vector components from steps 532 and 535 and outputs a yaw perception $\psi_p$.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A process for controlling an angular velocity of an arm and angular positions of gimbals of a gimbaled motion base system substantially duplicating predicted operator perceptions of angular motion from a simulated moving vehicle, said process including the steps, performed by a data processor of the system, of:

computing the angular velocity of the arm and the positions of the gimbals in accordance with a total linear acceleration vector and a total angular acceleration vector of the simulated vehicle, the total linear acceleration vector having component linear accelerations Gxa, Gya, and Gza, and the total angular acceleration vector having component angular accelerations $\dot{p}_a$, $\dot{q}_a$, and $\dot{r}_a$;

controlling the angular velocity of the arm and the positions of the gimbals in accordance with the computed angular velocity and positions;

determining, for an operator of the motion base system and for an operator of the simulated vehicle, a predicted perception of angular motion about the pitch, roll, and yaw axes in accordance with the component linear accelerations and the component angular accelerations of the respective systems;

comparing the predicted perception of angular motion about each axis by the operator of the motion base system to the predicted perception of angular motion about each axis by the operator of the simulated vehicle to determine a difference therebetween; and modifying the computed gimbal positions to substantially reduce said difference in perceived angular motion.

2. The process of claim 1 wherein the step of determining the predicted perception of angular motion about the pitch, roll, and yaw axes by the operators of both the simulated vehicle and the motion base system includes the steps of:

determining a pure angular motion perception in accordance with respective filtered angular velocities about each axis of both the simulated vehicle and the motion base;

determining a pure vector angular motion perception in accordance with the rotation of the component linear acceleration vector about the respective axis where a $G_y$ component determines both perceived roll and perceived yaw angular motion for the operator in accordance with the relative magnitudes of $G_z$ and $G_x$ components; and adding the determined pure angular perceived motions to the respective determined pure vector perceived motions to produce the determined operator perception of angular motion about the pitch, roll, and yaw axes, of both the simulated vehicle and the motion base.

3. The process of claim 1 further including the steps of:

preselecting an initial orientation of the motion base operator with respect to a forward motion and an axis of the arm from a number of possible orientations dependent on a type of vehicle motion to be simulated; and accomplishing the initial orientation by performing one of:

repositioning the operator within the gimbal system, and repositioning an initial orientation of one or more gimbals.

4. The process of claim 1 wherein the computing step includes a step of computing a transition between sustained positive $G_{za}$ and negative $G_{za}$ via a pitch or roll maneuver.

5. The process of claim 1 wherein the computing step generates an angular velocity of the arm of the motion base system, and includes the substeps of:

receiving the three component linear acceleration vectors of the simulated vehicle, $G_{xa}$, $G_{ya}$, and $G_{za}$;

adding the $G_{xa}$, $G_{ya}$, and $G_{za}$ values to produce a $G_{TOTa}$ linear acceleration vector of the simulated vehicle;

scaling the $G_{xa}$, $G_{ya}$, and $G_{za}$ values to produce scaled $G_{xa}$, $G_{ya}$, and $G_{za}$ values;

adding the scaled $G_{xa}$, $G_{ya}$, and $G_{za}$ values to produce a scaled $G_{TOT}$ linear acceleration vector;

biasing the scaled $G_{TOT}$ linear acceleration vector according to one of a pluraltiy of predetermiend bias functions to produce a biased $G_{TOT}$ linear force vector;

computing the angular velocity of the arm from the biased $G_{TOT}$ linear acceleration vector and a radius of the arm; and computing the radial and tangential accelerations of the arm from the computed angular velocity of the arm.

6. The process of claim 5 wherein, when the motion base system is capable of producing a full G range of the simulated vehicle and, when the motion base operator indicates large changes in motion, the step of biasing the $G_{TOT}$ linear acceleration vector includes the step of biasing the $G_{TOT}$ linear acceleration vector with a full G bias function.

7. The process of claim 5 wherein, when the motion base system is capable of producing a full G range of the simulated vehicle and, when the motion base operator indicates small changes in motion, the step of biasing the $G_{TOT}$ linear acceleration vector includes the step of biasing the $G_{TOT}$ linear acceleration vector with a low G bias function.

8. The process of claim 5 wherein, when the motion base system is capable of producing a limited G range, the step of biasing the $G_{TOT}$ linear acceleration vector includes the step of biasing the $G_{TOT}$ linear acceleration vector with a limited G bias function to compensate for the limited G range.

9. The process of claim 5 wherein, when the motion base system is operated in a "gimbals only" mode, the step of biasing the $G_{TOT}$ linear acceleration vector includes the step of biasing the $G_{TOT}$ linear acceleration vector with a low but constant G bias function.

10. The process of claim 1 wherein, when the motion base system is limited to two gimbals, A and B, the step of computing the angular positions of the gimbals includes the substeps of:

computing radial and tangential accelerations of the arm;

filtering the computed radial and tangential accelerations of the arm to produce filtered radial accelerations and filtered tangential accelerations, which compensate for differences in response characteristics between a drive motor of the arm and drive motors of the gimbals;

adding the filtered radial acceleration, the filtered tangential acceleration, and the vertical acceleration of gravity to produce a total linear acceleration vector of the motion base (GTOTv);

computing first gimbal positions in accordance with the filtered radial and tangential accelerations of the arm which align the motion base operator with the GTOTv linear acceleration vector;

computing second gimbal positions in accordance with scaled component linear accelerations of the simulated vehicle and the linear GTOTv acceleration vector of the arm to produce the component linear accelerations (Gxv, Gyv, and Gzv) of the motion base where each component acceleration is equal to the same component of the simulated vehicle scaled by the factor GTOTv/GTOTa;

computing third gimbal posits in accordance with two of the three scaled and two of the three filtered component angular accelerations of the simulated vehicle;

adding the first, second, and third computed gimbal positions to produce the determined positions for each gimbal A and B;

computing artifact angular accelerations $\dot{p}_v$, $\dot{q}_v$, and $\dot{r}_v$ of the motion base, which include cross-coupling coriolis accelerations of the motion base, in accordance with the determined angular positions and determined angular velocities for each gimbal and the angular velocity of the arm;

filtering the computed artifact angular accelerations $\dot{p}_v$, $\dot{q}_v$, and $\dot{r}_v$ quantities of the motion base;

computing the predicted operator perception of angular motion about each axis due to the artifact angular accelerations, which include cross coupling coriolis accelerations;

computing fourth gimbal positions in accordance with two out of three of computed pitch, roll, and yaw perceptions to produce rotating linear acceleration vectors which counteract the operator's perception of the angular acceleration artifacts, said computation involving the process of further filtering the filtered pv, qv, and rv quantities by an inverse transform producing a feed forward fourth gimbal position for each gimbal; and adding the fourth gimbal positions to the previously determined gimbal positions to produce the desired gimbal positions for each gimbal where the final gimbal motion is different from the vehicle motion to be simulated.

11. The process of claim 1, wherein the motion base system has three gimbals: A, B, and C, and wherein the step of computing the angular positions of the gimbals includes the substeps of:

computing first gimbal positions in accordance with the filtered radial and tangential accelerations of the arm which align the motion base operator with the GTOTv linear acceleration vector;

computing second gimbal positions in accordance with the scaled Gxv, Gyv, and Gzv component linear accelerations of the simulated vehicle and the GTOTv linear acceleration vector of the arm to produce the component linear accelerations (Gxa, Gya, and Gza) of the motion base where each component acceleration is equal to the same component of the simulated vehicle scaled by the factor GTOTv/GTOTa;

computing third gimbal positions in accordance with the three scaled an three filtered angular component accelerations of the simulated vehicle;

adding the first, second, and third computed gimbal positions to produce the determined positions for each gimbal, A, B, and C, wherein the angular excursions of the A and B gimbals for the three gimbal motion base system are substantially reduced from those of a two gimbal motion base system;

computing the artifact angular accelerations $\dot{p}_v$, $\dot{q}_v$, and $\dot{r}_v$ of the motion base, which include cross-coupling coriolis accelerations of the motion base, in accordance with the determined angular positions and determined angular velocities for each gimbal and the angular velocity of the arm;

filtering the computed artifact angular accelerations $\dot{p}_v$, $\dot{q}_v$, and $\dot{r}_v$ quantities of the motion base;

computing the predicted operator perception of angular motion about each axis due to the artifact angular accelerations, which include the cross coupling coriolis accelerations;

computing fourth gimbal positions in accordance with the computed pitch, roll, and yaw perceptions to produce rotating linear acceleration vectors which counteract the operator's perception of the angular acceleration artifacts, said computation involving the process of further filtering the filtered pv, qv, and rv quantities by an inverse transform producing a feed forward fourth gimbal position for each gimbal; and adding the fourth gimbal positions to the previously determined gimbal positions to produce the desired gimbal positions for each gimbal where the final gimbal motion is different from the vehicle motion to be simulated.

12. A control system for performing the processes of claims 5, 10 or 11 wherein the steps of computing the angular velocity of the arm and computing the angular positions of the gimbals are performed separately; thus providing versatility in turning the control of the motion base system by enabling independent adjustments to the filters and gain of each circuit without interfering with the other circuits.

13. A process for controlling an angular velocity of an arm and angular positions of gimbals of a gimbaled motion base system substantially duplicating predicted operator perceptions of angular motion from a simulated moving vehicle, said process including the steps, performed by a data processor of the system, of:

controlling the angular velocity of the arm to be a constant angular velocity;

computing the positions of the gimbals, in accordance with a total linear acceleration vector and a total angular accelerations vector of the simulated vehicle, the total linear acceleration vector having component linear accelerations Gxa, Gya, and Gza, and the total angular acceleration vector having component angular accelerations $\dot{p}_a$, $\dot{q}_a$, and $\dot{r}_a$;

controlling the positions of the gimbals in accordance with the computed gimbal positions;

determining, for an operator of the motion base system and for an operator of the simulated vehicle, a predicted perception of angular motion about the pitch, roll, and yaw axes in accordance with the component linear accelerations and the component angular accelerations of the respective systems;

comparing the predicted perception of angular motion about each axis by the operator of the motion base system to the predicted perception of angular motion about each axis by the operator of the simulated vehicle to determine a difference therebetween; and modifying the computed gimbal positions to substantially reduce said difference in perceived angular motion.

14. The process of claim 13 wherein, when the motion base system is operated in a "gimbals only" mode, the step of controlling the angular velocity of the arm includes a step of biasing the total linear acceleration vector with a low but constant G bias function.

15. A process for generating an angular velocity of an arm and angular positions of gimbals of a gimbaled motion base system substantially duplicating predicted operator perceptions of angular motion from a simulated moving vehicle, said process including the steps, performed by a data processor, of:

computing the angular velocity of the arm and the positions of the gimbals, wherein the computing step includes a step of computing a transition between sustained positive Gza and negative Gza via a pitch or roll maneuver, where Gza is a vertical acceleration component of the simulated vehicle of the simulated vehicle;

controlling the angular velocity of the arm and the positions of the gimbals in accordance with the computed angular velocity and gimbal positions;

determining, for an operator of the motion base system and for an operator of the simulated vehicle, a predicted perception of angular motion about each axis of the system in accordance with a total linear acceleration vector, having component linear accelerations Gx, Gy, and Gz, and component angular accelerations ($\dot{p}$, $\dot{q}$, and $\dot{r}$) of the respective systems;

comparing the predicted perception of angular motion about each axis by the operator of the motion base system to the predicted perception of angular motion about each axis by the operator of the simulated vehicle to determine a difference therebetween; and modifying the computed gimbal positions to substantially reduce said difference in perceived angular motion.

* * * * *

UNITED STATES PATENT AND TRADEMARK OFFICE
CERTIFICATE OF CORRECTION

PATENT NO. : 5,353,242
DATED : October 4, 1994
INVENTOR(S) : RICHARD J. CROSBIE ET AL.

It is certified that error appears in the above-indentified patent and that said Letters Patent is hereby corrected as shown below:

Claim 5, column 24, line 60, change "pluraltiy" to -- plurality -- and change "predetermiend" to -- predetermined --.

Claim 10, column 26, line 11, change "pv, qv, and rv" to -- $p_v$, $q_v$, and $r_v$ --.
Claim 11, column 26, line 37, change "an" to -- and --.

Claim 11, column 26, line 64, change "pv, qv, and rv" to -- $p_v$, $q_v$, and $r_v$ --.
Claim 13, column 27, line 22, change "accelerations" to -- acceleration --.

Signed and Sealed this

Fourth Day of April, 1995

Attest:

BRUCE LEHMAN

*Attesting Officer*    *Commissioner of Patents and Trademarks*